(12) United States Patent
Hatano et al.

(10) Patent No.: US 11,667,986 B2
(45) Date of Patent: Jun. 6, 2023

(54) FERRITIC STAINLESS STEEL AND METHOD FOR MANUFACTURING SAME, FERRITIC STAINLESS STEEL SHEET AND METHOD FOR MANUFACTURING SAME, AND FUEL CELL MEMBER

(71) Applicant: NIPPON STEEL STAINLESS STEEL CORPORATION, Tokyo (JP)

(72) Inventors: Masaharu Hatano, Tokyo (JP); Mitsuki Sugeoi, Tokyo (JP); Takumi Nishimoto, Tokyo (JP)

(73) Assignee: NIPPON STEEL STAINLESS STEEL CORPORATION, Tokyo (JP)

( * ) Notice: Subject to any disclaimer, the term of this patent is extended or adjusted under 35 U.S.C. 154(b) by 172 days.

(21) Appl. No.: 17/040,870

(22) PCT Filed: Mar. 26, 2019

(86) PCT No.: PCT/JP2019/012843
§ 371 (c)(1),
(2) Date: Sep. 23, 2020

(87) PCT Pub. No.: WO2019/189174
PCT Pub. Date: Oct. 3, 2019

(65) Prior Publication Data
US 2021/0025022 A1 Jan. 28, 2021

(30) Foreign Application Priority Data

Mar. 27, 2018 (JP) .............................. JP2018-060883
Mar. 27, 2018 (JP) .............................. JP2018-060885
Mar. 27, 2018 (JP) .............................. JP2018-060886

(51) Int. Cl.
| | |
|---|---|
| *C22C 38/06* | (2006.01) |
| *C21D 9/46* | (2006.01) |
| *C21D 6/00* | (2006.01) |
| *C21D 8/02* | (2006.01) |
| *C22C 38/00* | (2006.01) |
| *C22C 38/02* | (2006.01) |
| *C22C 38/04* | (2006.01) |
| *C22C 38/42* | (2006.01) |
| *C22C 38/44* | (2006.01) |
| *C22C 38/46* | (2006.01) |
| *C22C 38/48* | (2006.01) |
| *C22C 38/50* | (2006.01) |
| *C22C 38/52* | (2006.01) |
| *C22C 38/54* | (2006.01) |
| *C22C 38/58* | (2006.01) |

(52) U.S. Cl.
CPC .............. *C21D 9/46* (2013.01); *C21D 6/004* (2013.01); *C21D 6/005* (2013.01); *C21D 6/008* (2013.01); *C21D 8/0205* (2013.01); *C21D 8/0236* (2013.01); *C21D 8/0273* (2013.01); *C21D 8/0278* (2013.01); *C22C 38/001* (2013.01); *C22C 38/002* (2013.01); *C22C 38/005* (2013.01); *C22C 38/008* (2013.01); *C22C 38/02* (2013.01); *C22C 38/04* (2013.01); *C22C 38/06* (2013.01); *C22C 38/42* (2013.01); *C22C 38/44* (2013.01); *C22C 38/46* (2013.01); *C22C 38/48* (2013.01); *C22C 38/50* (2013.01); *C22C 38/52* (2013.01); *C22C 38/54* (2013.01); *C22C 38/58* (2013.01); *C21D 2211/005* (2013.01)

(58) Field of Classification Search
CPC ...... C21D 9/46; C21D 2211/005; C22C 38/06
See application file for complete search history.

(56) References Cited

U.S. PATENT DOCUMENTS

| | | | |
|---|---|---|---|
| 8,062,584 B2 * | 11/2011 | Hamada ................ | C21D 6/002 420/68 |
| 10,544,490 B2 * | 1/2020 | Hatano ................. | H01M 8/06 |
| 10,752,973 B2 * | 8/2020 | Abe ...................... | C21D 8/0236 |
| 10,793,930 B2 * | 10/2020 | Hayashi ................ | C22C 38/44 |
| 10,995,888 B2 * | 5/2021 | Mitsunaga ............ | C22C 38/001 |
| 11,091,824 B2 * | 8/2021 | Matsuhashi ........... | C22C 38/32 |
| 11,215,299 B2 * | 1/2022 | Abe ....................... | C21D 9/46 |
| 11,242,578 B2 * | 2/2022 | Hamada ................ | C22C 38/34 |
| 11,286,547 B2 * | 3/2022 | Abe ....................... | C22C 38/42 |
| 11,326,236 B2 * | 5/2022 | Tai ........................ | C21D 8/0463 |
| 2015/0010771 A1 | 1/2015 | Mizutani et al. | |
| 2015/0218683 A1 | 8/2015 | Nakamura et al. | |

(Continued)

FOREIGN PATENT DOCUMENTS

| | | |
|---|---|---|
| CN | 101845604 A | 9/2010 |
| CN | 102277538 A | 12/2011 |

(Continued)

OTHER PUBLICATIONS

English machine translation of JP 2015145531 A of Tamura (Year: 2015).*
International Search Report for PCT/JP2019/012843 dated Jun. 25, 2019.
Bernstein et al., "Residual and Minor Elements in Stainless Steels," Handbook of Stainless Steels, Jan. 1, 1977, Chapter 14, XP-002430954, pp. 1-14.
Chinese Notice of Allowance and Search Report for corresponding Chinese Application No. 201980020968.1, dated Nov. 1, 2021, with an English translation of the Search Report.

(Continued)

*Primary Examiner* — Jophy S. Koshy
(74) *Attorney, Agent, or Firm* — Birch, Stewart, Kolasch & Birch, LLP

(57) ABSTRACT

Ferritic stainless steel is characterized by including, by mass %: Cr: 12.0% to 16.0%; C: 0.020% or less; Si: 2.50% or less; Mn: 1.00% or less; P: 0.050% or less; S: 0.0030% or less; Al: 2.50% or less; N: 0.030% or less; Nb: 0.001% to 1.00%; one or more of B: 0.0200% or less, Sn: 0.20% or less, Ga: 0.0200% or less, Mg: 0.0200% or less, and Ca: 0.0100% or less; and a balance consisting of Fe and impurities, in which Expression (1) is satisfied.

$$10(B+Ga)+Sn+Mg+Ca > 0.020 \qquad (1)$$

9 Claims, 1 Drawing Sheet

(56) References Cited

U.S. PATENT DOCUMENTS

| | | | |
|---|---|---|---|
| 2017/0107593 A1 | 4/2017 | Hamada et al. | |
| 2017/0314093 A1 | 11/2017 | Hamada et al. | |
| 2021/0010119 A1* | 1/2021 | Kaneko | C22C 38/001 |
| 2021/0025022 A1* | 1/2021 | Hatano | C22C 38/54 |

FOREIGN PATENT DOCUMENTS

| | | |
|---|---|---|
| CN | 103866194 A | 6/2014 |
| CN | 104120357 A | 10/2014 |
| CN | 105980613 A | 9/2016 |
| CN | 106103773 A | 11/2016 |
| CN | 107709592 A | 2/2018 |
| EP | 1 826 288 A1 | 8/2007 |
| EP | 2 412 837 A1 | 2/2012 |
| EP | 3 130 688 A1 | 2/2017 |
| EP | 3 176 277 A1 | 6/2017 |
| JP | 2009-167443 A | 7/2006 |
| JP | 2010-222638 A | 10/2010 |
| JP | 2011-174152 A | 9/2011 |
| JP | 2011-202833 A | 10/2011 |
| JP | 2011-202838 A | 10/2011 |
| JP | 2014-177659 A | 9/2014 |
| JP | 2015-145531 A | 8/2015 |
| JP | 2016-84545 A | 5/2016 |
| JP | 2016-183400 A | 10/2016 |
| JP | 6006893 B2 | 10/2016 |
| JP | 2016-204709 A | 12/2016 |
| JP | 2016-211076 A | 12/2016 |
| JP | 6053994 B1 | 12/2016 |
| TW | 201213559 A1 | 4/2012 |
| TW | 201323628 A1 | 6/2013 |
| WO | WO 2013/114833 A1 | 8/2013 |
| WO | WO 2014/157578 A1 | 10/2014 |
| WO | WO 2015/147211 A1 | 10/2015 |
| WO | WO 2016/068139 A1 | 5/2016 |
| WO | WO 2017/073093 A1 | 5/2017 |

OTHER PUBLICATIONS

Partial Supplementary European Search Report for corresponding European Application No. 19775851.9, dated Oct. 21, 2021.

Chinese Office Action and Search Report for counterpart Chinese Application No. 201980020966.1, dated May 7, 2021, with English translation.

Jipeng, "CDFD, volume: Engineering Technology I, No. 7", Study on the Preparation Process, Structure and Properties of Tin Containing Ferritic Stainless Steel, Jul. 15, 2017, 80 pages total, with English abstract.

Li et al., "Formability of Sn-containing ferrite stainless steel sheet," Procedia Engineering, vol. 81, Oct. 24, 2014, pp. 1271-1276.

Wang et al., "Study on Microstructure and Properties of Ferritic Stainless Steel," Foundry Technology, vol. 37, No. 7, Jul. 18, 2016, pp. 1357-1359, with English abstract.

Extended European Search Report for corresponding European Application No. 22154962.9, dated Jul. 1, 2022.

Taiwanese Office Action and Search Report for corresponding Taiwanese Application No. 108110280, dated Jul. 13, 2022, with a partial English translation of the Search Report.

* cited by examiner

FERRITIC STAINLESS STEEL AND METHOD FOR MANUFACTURING SAME, FERRITIC STAINLESS STEEL SHEET AND METHOD FOR MANUFACTURING SAME, AND FUEL CELL MEMBER

TECHNICAL FIELD

The present invention relates to ferritic stainless steel and a method for manufacturing the same, a ferritic stainless steel sheet and a method for manufacturing the same, and a fuel cell member.

Priority is claimed on Japanese Patent Application No. 2018-060883, filed Mar. 27, 2018, Japanese Patent Application No. 2018-060885, filed Mar. 27, 2018, Japanese Patent Application No. 2018-060886, filed Mar. 27, 2018, the contents of which are incorporated herein by reference.

BACKGROUND ART

Recently, the spread of new systems to replace conventional power generation systems has accelerated rapidly because of the depletion of fossil fuels; petroleum use and global warming due to $CO_2$ emissions being two such concerns. As one such system, "fuel cells", which have high practical value as dispersed power sources, and power sources for automobiles, have drawn attention. There are several types of fuel cells, and among them, a polymer electrolyte fuel cell (PEFC) and a solid oxide fuel cell (SOFC) are expected to be widely used in the future because they have high energy efficiency.

A fuel cell is a device that generates electric power through a reverse reaction process of electrolysis of water, and requires hydrogen (hydrogen fuel) as a fuel.

Hydrogen fuel is manufactured by a reforming reaction of hydrocarbon fuels such as city gas (LNG), methane, natural gas, propane, kerosene, and gasoline in the presence of a catalyst. Among them, a fuel cell having city gas as a raw fuel has an advantage in that hydrogen can be manufactured in an area in which city gas pipes are provided.

A fuel reformer is generally operated at a high temperature of 200° C. to 900° C. to provide the amount of heat necessary for a reforming reaction of hydrogen. In addition to the fuel reformer, a temperature for operating a combustor that heats the reformer, a heat exchanger, a main body part of a battery, and the like is also extremely high.

Furthermore, such a fuel cell operating at high temperature is exposed to an atmosphere containing a large amount of hydrogen and a small amount of hydrogen sulfide derived from a hydrocarbon fuel in addition to a large amount of water vapor, carbon dioxide, and carbon monoxide (hereinafter, also referred to as carburizing/reducing/sulfidizing environments). When, for example, a steel material is exposed to such an atmosphere, carburization and sulfidization cause corrosion of a material surface, making the operating environments severe.

Until now, an austenitic stainless steel represented by SUS310S (25Cr-20Ni) has been used as a practical material for fuel cells having sufficient durability under such severe environments. However, cost reduction is indispensable for the spread of fuel cell systems in the future, and cost reduction of an alloy for optimizing materials used is an important problem.

Furthermore, because the temperature for operating a fuel cell system is extremely high in the case of using stainless steel containing a relatively high amount of Cr, there is a problem regarding preventing poisoning of electrodes due to Cr vaporization.

Based on the above-described background, as steel constituting a fuel cell, studies have been conducted on various types of Al-containing ferritic stainless steel in which high oxidation resistance of an Al-based oxide layer (Al-based oxide film) is utilized since favorable durability is exhibited even under a severe reformed gas environment.

Based on the above-described background, as steel constituting a fuel cell, studies have been conducted on various types of ferritic stainless steel capable of exhibiting favorable durability even under the above-described severe environments such as high temperature and carburizing/reducing/sulfidizing environments.

Patent Document 1 discloses Al-containing ferritic stainless steel for fuel cells, which contains Cr: 13% to 20%, C: less than 0.02%, N: 0.02% or less, Si: more than 0.15% to 0.7%, Mn: 0.3% or less, Al: 1.5% to 6%, Ti: 0.03% to 0.5%, and Nb: 0.6% or less, and which has favorable oxidation resistance and creep fracture lifetime by adjusting an amount of solid solution Ti and an amount of solid solution Nb. This stainless steel shows that favorable oxidation resistance can be obtained by an accelerated oxidation test at 1,050° C. in atmospheric air.

Patent Document 2 discloses ferritic stainless steel for fuel cells which contains Cr: 11% to 25%, C: 0.03% or less, Si: 2% or less, Mn: 2% or less, Al: 0.5% to 4.0%, P: 0.05% or less, S: 0.01% or less, N: 0.03% or less, and Ti: 1% or less, and contains 50% by volume or more of hydrogen gas, and in which oxidation resistance under a reformed gas environment is improved by adding a small amount of Mg, Ga, Sn, and Sb while concentrating Ti and Al in an oxide film and on a steel surface immediately beneath the oxide film.

Patent Document 3 discloses ferritic stainless steel for fuel cells, which contains Cr: 11.0% to 25.0%, C: 0.030% or less, Si: 2.00% or less, Mn: 2.00% or less, Al: 0.90% to 4.00%, P: 0.050% or less, S: 0.0100% or less, N: 0.030% or less, and Ti: 0.500% or less, and in which oxidation resistance and creep endurance under a reformed gas environment are improved by the addition of a small amount of B, Mg, and Ca and combined addition of Sn.

Patent Document 4 discloses ferritic stainless steel which contains Cr: 11% to 25%, C: 0.03% or less, Si: 2% or less, Mn: 2% or less, Al: 0.5% to 4.0%, P: 0.05% or less, S: 0.01% or less, N: 0.03% or less, and Ti: 0.5% or less, and contains one or more of Ga: 0.1% or less, Mg: 0.01% or less, and Zn: 0.05% or less, and in which oxidation resistance is improved by forming a surface film in which Ti and/or Al is concentrated by adding a small amount of Mg, Ga, and Zn, and further adding a small amount of Sn and Sb.

CITATION LIST

Patent Document

[Patent Document 1]
Japanese Unexamined Patent Application, First Publication No. 2010-222638
[Patent Document 2]
Japanese Patent No. 6006893
[Patent Document 3]
Japanese Patent No. 6053994

[Patent Document 4]
Japanese Unexamined Patent Application, First Publication No. 2016-211076

SUMMARY OF INVENTION

Technical Problem

A reformed gas of the above-mentioned fuel cell using city gas and the like as a raw fuel may contain a large amount of hydrogen in addition to water vapor, carbon dioxide, and carbon monoxide, and a sulfidized component added as an impurity or an odorant. However, in the related art, oxidation resistance of ferritic stainless steel has been evaluated and examined only in an atmosphere containing water vapor and carbon dioxide as main components or an atmosphere containing water vapor and oxygen as main components, or under an environment such as atmospheric air. That is, oxidation characteristics of ferritic stainless steel under severe environments containing carbon dioxide, carbon monoxide, a large amount of hydrogen, and a sulfidized component (carburizing/reducing/sulfidizing environments) are unknown.

Furthermore, in addition to the above-mentioned oxidation characteristics, further improvement in high-temperature strength is required in a case of a SOFC system or a PEFC system since a temperature for operating a fuel cell is high.

Although durability under an oxidizing environment has been examined for the ferritic stainless steel of Patent Document 1 to Patent Document 4, there is no mention of durability in more severe environments such as carburizing/reducing/sulfidizing environments containing a large amount of hydrogen and hydrogen sulfide.

The present invention has been devised to solve the above-mentioned problems, and provides ferritic stainless steel having both high oxidation resistance and excellent high-temperature strength, and a method for manufacturing the same, and ferritic stainless steel sheet having both high oxidation resistance and excellent high-temperature strength, and a method for manufacturing the same, even under environments containing carbon dioxide, carbon monoxide, a large amount of hydrogen, and a sulfidized component (carburizing/reducing/sulfidizing environments).

Solution to Problem

A first aspect of the present invention is as follows.
[1-1] Ferritic stainless steel including, by mass %:
Cr: 12.0% to 16.0%;
C: 0.020% or less;
Si: 2.50% or less;
Mn: 1.00% or less;
P: 0.050% or less;
S: 0.0030% or less;
Al: 2.50% or less;
N: 0.030% or less;
Nb: 0.001% to 1.00%;
Ni: 0% to 1.0%;
Cu: 0% to 1.0%;
Mo: 0% to 1.0%;
Sb: 0% to 0.5%;
W: 0% to 1.0%;
Co: 0% to 0.5%;
V: 0% to 0.5%;
Ti: 0% to 0.5%;
Zr: 0% to 0.5%;
La: 0% to 0.1%;
Y: 0% to 0.1%;
Hf: 0% to 0.1%;
REM: 0 to 0.1%;
one or more of B: 0.0200% or less, Sn: 0.20% or less, Ga: 0.0200% or less, Mg: 0.0200% or less, and Ca: 0.0100% or less; and a balance consisting of Fe and impurities, wherein Expression (1) is satisfied, $$10(B+Ga)+Sn+Mg+Ca>0.020 \qquad (1)$$

where each of the element symbols in Expression (1) indicates the content (mass %) of each of the elements in the steel.

[1-2] The ferritic stainless steel according to [1-1], including B: 0.0002% or more by mass %.

[1-3] The ferritic stainless steel according to [1-1] or [1-2], in which the concentration of Nb at a crystal grain boundary is within a range of 3.0% to 10% by mass %.

[1-4] The ferritic stainless steel according to any one of [1-1] to [1-3], including Sn: 0.005% or more by mass %, in which the concentration of Sn at a crystal grain boundary is 1.0% to 5.0% by mass %.

[1-5] The ferritic stainless steel according to any one of [1-1] to [1-4], including, by mass %: Si: 0.5% or more; Al: 1% or more; and Nb: 0.15% or more.

[1-6] The ferritic stainless steel according to any one of [1-1] to [1-5], including, by mass %, one or more of Ni: 0.10% to 1.0%, Cu: 0.10% to 1.0%, Mo: 0.10% to 1.0%, Sb: 0.01% to 0.5%, W: 0.10% to 1.0%, Co: 0.10% to 0.5%, V: 0.10% to 0.5%, Ti: 0.01% to 0.5%, Zr: 0.01% To 0.5%, La: 0.001% to 0.1% or less, Y: 0.001% to 0.1%, Hf: 0.001% to 0.1%, and REM: 0.001% to 0.1%.

[1-7] The ferritic stainless steel according to any one of [1-1] to [1-6], which is applied to a fuel reformer, a heat exchanger, or a fuel cell member.

[1-8] The ferritic stainless steel according to any one of [1-1] to [1-7], which is applied to a combustor or a burner member.

[1-9] A method for manufacturing the ferritic stainless steel according to any one of [1-1] to [1-6], the method including: performing hot working on the stainless steel having the composition according to any one of [1-1], [1-2], [1-5], and [1-6]; performing a heat treatment at a temperature higher than 700° C. or not performing the heat treatment thereafter; performing cold working thereafter; and performing final annealing at a temperature higher than 700° C.

[1-10] The method for manufacturing the ferritic stainless steel according to [1-9], the method further comprising performing a heat treatment to retain a temperature within a temperature range of 600° C. to 700° C. for longer than 1 minute and 3 hours or shorter after the final annealing.

[1-11] The method for manufacturing the ferritic stainless steel according to [1-9], in which, when performing heating at a temperature higher than 700° C. and cooling in the final annealing, a retention time for a temperature within a temperature range of 600° C. to 700° C. is set to 1 minute or longer.

[1-12] A fuel cell member formed of the ferritic stainless steel according to any one of [1-1] to [1-6].

A second aspect of the present invention is as follows.
[2-1] A ferritic stainless steel sheet including, by mass %:
Cr: 12.0% to 16.0%;
C: 0.020% or less;
Si: 2.50% or less;
Mn: 1.00% or less;
P: 0.050% or less;
S: 0.0030% or less;

Al: 2.50% or less;
N: 0.030% or less;
Nb: 0.001% to 1.00%;
Ni: 0% to 1.0%;
Cu: 0% to 1.0%;
Mo: 0% to 1.0%;
Sb: 0% to 0.5%;
W: 0% to 1.0%;
Co: 0% to 0.5%;
V: 0% to 0.5%;
Ti: 0% to 0.5%;
Zr: 0% to 0.5%;
La: 0% to 0.1%;
Y: 0% to 0.1%;
Hf: 0% to 0.1%;
REM: 0% to 0.1%;
two or more of B: 0.0200% or less, Sn: 0.20% or less, Ga: 0.0200% or less, Mg: 0.0200% or less, and Ca: 0.0100% or less; and a balance consisting of Fe and impurities,
wherein Expression (1) is satisfied, and
the texture of a plate thickness middle portion satisfies the following conditions of (A) and (B):
(A) in the plate thickness middle portion, an area ratio of $\{111\}\pm10°$ oriented grains, in which an angle difference between a normal direction of a steel sheet surface and a $\{111\}$ plane orientation is within 10°, is more than 20% and less than 60%; and
(B) in the plate thickness middle portion, an area ratio of $\{110\}\pm10°$ oriented grains, in which an angle difference between a normal direction of a steel sheet surface and a $\{110\}$ plane orientation is within 10°, is more than 0.5% and less than 5%, $$10(B+Ga)+Sn+Mg+Ca>0.020 \qquad (1)$$

where each of the element symbols in Expression (1) indicates the content (mass %) of each of the elements in the steel.

[2-2] The ferritic stainless steel sheet according to [2-1], including B: 0.0002% or more by mass %.

[2-3] The ferritic stainless steel sheet according to [2-1] or [2-2], including, by mass %: Si: 0.5% or more; Al: 1% or more; and Nb: 0.15% or more.

[2-4] The ferritic stainless steel sheet according to any one of [2-1] to [2-3], including, by mass %, one or more of Ni: 0.10% to 1.0%, Cu: 0.10% to 1.0%, Mo: 0.10% to 1.0%, Sb: 0.01% to 0.5%, W: 0.10% to 1.0%, Co: 0.10% to 0.5%, V: 0.10% to 0.5%, Ti: 0.01% to 0.5%, Zr: 0.01% To 0.5%, La: 0.001% to 0.1% or less, Y: 0.001% to 0.1%, Hf: 0.001% to 0.1%, and REM: 0.001% to 0.1%.

[2-5] The ferritic stainless steel sheet according to any one of [2-1] to [2-4], which is applied to a fuel reformer, a heat exchanger, or a fuel cell member.

[2-6] The ferritic stainless steel sheet according to any one of [2-1] to [2-5], which is applied to a combustor or a burner member.

[2-7] A method for manufacturing the ferritic stainless steel sheet according to any one of [2-1] to [2-6], the method including: performing hot rolling on the stainless steel having the composition according to any one of [2-1] to [2-4]; performing a heat treatment at 700° C. or lower or not performing the heat treatment thereafter; and performing cold rolling at a rolling reduction rate of 30% to 80% and a final heat treatment in this order thereafter.

[2-8] A fuel cell member formed of the ferritic stainless steel sheet according to any one of [2-1] to [2-6].

A third aspect of the present invention is as follows.

[3-1] Ferritic stainless steel sheet including, by mass %:
Cr: 12.0% to 16.0%;
C: 0.020% or less;
Si: 2.50% or less;
Mn: 1.00% or less;
P: 0.050% or less;
S: 0.0030% or less;
Al: 2.50% or less;
N: 0.030% or less;
Nb: 0.001% to 1.00%;
Ni: 0% to 1.0%;
Cu: 0% to 1.0%;
Mo: 0% to 1.0%;
Sb: 0% to 0.5%;
W: 0% to 1.0%;
Co: 0% to 0.5%;
V: 0% to 0.5%;
Ti: 0% to 0.5%;
Zr: 0% to 0.5%;
La: 0% to 0.1%;
Y: 0% to 0.1%;
Hf: 0% to 0.1%;
REM: 0% to 0.1%;
two or more of B: 0.0200% or less, Sn: 0.20% or less, Ga: 0.0200% or less, Mg: 0.0200% or less, and Ca: 0.0100% or less; and a balance consisting of Fe and impurities,
wherein Expression (1) is satisfied,
Expression (2) and Expression (3) are satisfied by each of maximum concentrations $Cr_m$, $Al_m$, and $Si_m$ (mass %) of Cr, Al, and Si in a surface layer part including a passivation film which is a region from a steel sheet surface to a depth of 30 nm, and
the texture of a plate thickness middle portion satisfies the following conditions of (A) and (B), $$10(B+Ga)+Sn+Mg+Ca>0.020 \qquad (1)$$

$$15.0<Cr_m(\text{mass \%})<55.0 \qquad (2)$$

$$3.0<Al_m+Si_m(\text{mass \%})<30.0 \qquad (3)$$

(A) in the plate thickness middle portion, an area ratio of $\{111\}\pm10°$ oriented grains, in which an angle difference between a normal direction of a steel sheet surface and a $\{111\}$ plane orientation is within 10°, is more than 20% and less than 60%, and (B) in the plate thickness middle portion, an area ratio of $\{110\}\pm10°$ oriented grains, in which an angle difference between a normal direction of a steel sheet surface and a $\{110\}$ plane orientation is within 10°, is more than 0.5% and less than 5%, where each of the element symbols in Expression (1) indicates the content (mass %) of each of the elements in the steel.

[3-2] The ferritic stainless steel sheet according to [3-1], including B: 0.0002% or more by mass %.

[3-3] The ferritic stainless steel sheet according to [3-1] or [3-2], including, by mass %: Si: 0.5% or more; Al: 1% or more; and Nb: 0.15% or more.

[3-4] The ferritic stainless steel sheet according to any one of [3-1] to [3-3], including, by mass %, one or more of Ni: 0.10% to 1.0%, Cu: 0.10% to 1.0%, Mo: 0.10% to 1.0%, Sb: 0.01% to 0.5%, W: 0.10% to 1.0%, Co: 0.10% to 0.5%, V: 0.10% to 0.5%, Ti: 0.01% to 0.5%, Zr: 0.01% To 0.5%, La: 0.001% to 0.1% or less, Y: 0.001% to 0.1%, Hf: 0.001% to 0.1%, and REM: 0.001% to 0.1%.

[3-5] The ferritic stainless steel sheet according to any one of [3-1] to [3-4], in which, in a case of measurement by hard X-ray photoelectron spectroscopy using hard X-rays of 7939 eV, a binding energy difference $\Delta E_{Al}$ (eV) between an oxide peak of the passivation film and a metal peak of a base material in the passivation film is $1.5<\Delta E_{Al}<3.0$ in a photoelectron spectrum for Al 1 s orbit, a binding energy difference $\Delta E_{Si}$ (eV) between an oxide peak of the passivation film and a metal peak of a base material in the passivation film is $1.0<\Delta E_{Si}<4.0$ in a photoelectron spectrum for Si 1 s orbit, a half-value width of the oxide peak in the photoelectron spectrum for the Al 1 s orbit is less than 2.5 eV, and a half-value width of the oxide peak in the photoelectron spectrum for the Si 1 s orbit is less than 2.5 eV.

[3-6] The ferritic stainless steel sheet according to any one of [3-1] to [3-5], which is applied to a fuel reformer, a heat exchanger, or a fuel cell member.

[3-7] The ferritic stainless steel sheet according to any one of [3-1] to [3-6], which is applied to a combustor or a burner member.

[3-8] A method for manufacturing the ferritic stainless steel sheet according to any one of [3-1] to [3-7], the method including: performing hot rolling on the stainless steel having the composition according to any one of [3-1] to [3-4]; performing a heat treatment at 700° C. or lower or not performing the heat treatment thereafter; performing cold rolling at a rolling reduction rate of 30% to 80% and final annealing in this order thereafter; performing polishing with a polishing material of #100 or less thereafter; and performing at least one of the following treatment (A) or treatment (B) thereafter, treatment (A): immersion in a sulfuric acid aqueous solution at 90° C. or lower containing 10 to 50 mass % of $H_2SO_4$, and treatment (B): immersion in a nitric-hydrofluoric acid aqueous solution at 90° C. or lower containing 1 mass % or more of $HNO_3$ and 0.5 mass % or more of HF.

[3-9] The method for manufacturing the ferritic stainless steel sheet according to [3-8], in which the final annealing is performed at 700° C. to 1,100° C.

[3-10] A fuel cell member formed of the ferritic stainless steel sheet according to any one of [3-1] to [3-7].

Advantageous Effects of Invention

According to the first to third aspects of the present invention, it is possible to provide ferritic stainless steel having both high oxidation resistance and excellent high-temperature strength, a method for manufacturing the same, and a fuel cell member, or a ferritic stainless steel sheet having both high oxidation resistance and excellent high-temperature strength, a method for manufacturing the same, and a fuel cell member, even under environments containing carbon dioxide, carbon monoxide, a large amount of hydrogen, and a sulfidized component (carburizing/reducing/sulfidizing environments).

DESCRIPTION OF EMBODIMENTS

Figure 1:
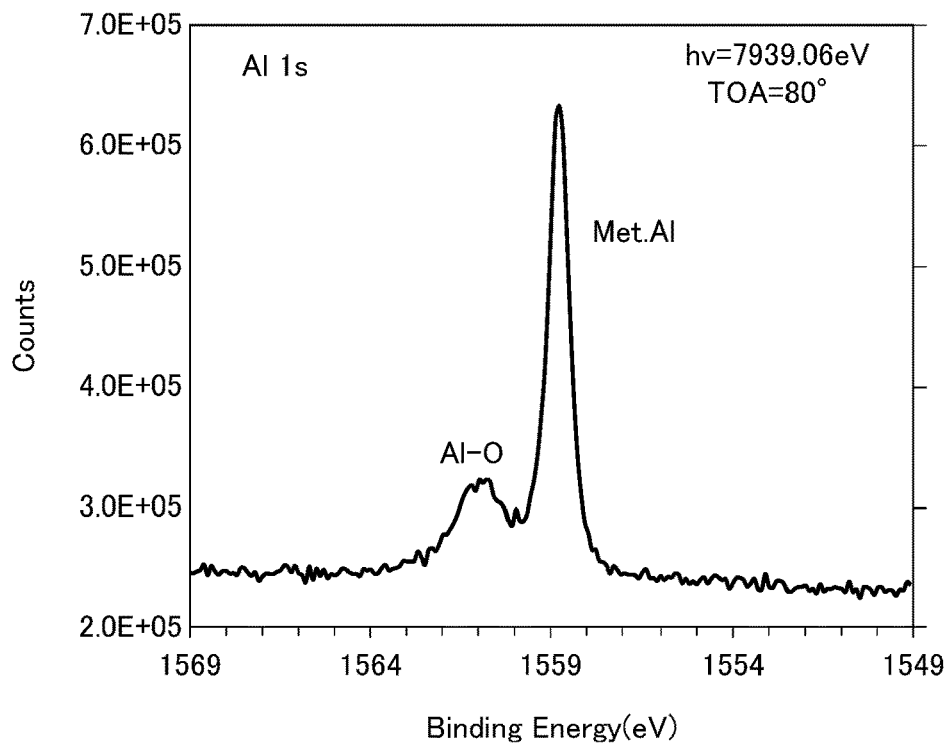
FIG. 1 is a diagram showing a photoelectron spectrum for Al 1 s orbit obtained by hard X-ray photoelectron spectroscopy in Present Example No. 3-6.

In order to solve the above-mentioned problems, the inventors of the present invention have conducted intensive experiments and studies on Al-containing ferritic stainless steel having both high-temperature strength and oxidation resistance, and therefore have completed the present invention. In the present embodiment, the term "high-temperature strength" means a characteristic in which an excellent 0.2% proof stress can be exhibited even in a high-temperature range around 750° C. to 800° C., and the term "oxidation resistance" means an oxidation characteristic under a reformed gas environment containing carbon dioxide, carbon monoxide, a large amount of hydrogen, and a sulfidized component (hereinafter, also referred to as carburizing/reducing/sulfidizing environments).

The findings obtained by the present invention will be described below.

[First Apect]

(1-a) In general, in order to prevent deformation of a structure operating at a high-temperature range around 750° C. to 800° C., which is regarded as a problem, it is effective to increase high-temperature strength, particularly a 0.2% proof stress of ferritic stainless steel as a material at around 750° C. and to inhibit a decrease of the 0.2% proof stress at around 800° C.

(1-b) It is found that the increase and the inhibition of a decrease of the 0.2% proof stress at a high-temperature range are not affected by excessive addition of Al, or addition of Mo, Cu, and the like, which contribute to solid solution strengthening/precipitation strengthening, but are remarkably improved by the addition of small amounts of B, Nb, Sn, Mg, Ca, and Ga and adjustment of the amounts added. That is, new findings are obtained in which, by adding small amounts of these elements in ferritic stainless steel, it is possible to achieve characteristics in which a 0.2% proof stress at around 750° C. is increased and a decrease of the 0.2% proof stress at around 800° C. is inhibited. Although there are still many unclear points regarding such an action of improving high-temperature strength, the action mechanism described below based on experimental findings is inferred.

(1-c) Addition of a small amount of B has effects of contributing to an increase of proof stress and tensile strength at 750° C. to 800° C. to a considerable extent, and significantly improving particularly a 0.2% proof stress. The addition of a small amount of B has effects of inhibiting generation of cavities (nano-sized gaps) starting from crystal grain boundaries due to boundary segregation of B, and thereby delaying grain boundary sliding, and increasing internal stress associated with an increase of a dislocation density in crystal grains. Furthermore, new findings in which the effects of B are remarkable for Nb-added steel are found.

(1-d) It is well known that addition of Nb is effective in increasing strength in a temperature range up to 750° C. by solid solution strengthening. Precipitation of Nb starts by forming an intermetallic compound called a Laves phase ($Fe_2Nb$) at 750° C. to 800° C., but Nb and B co-segregate at crystal grain boundaries, and thereby the effects of B of (1-c) can be manifested.

(1-e) Furthermore, the above-described effects of B, which are remarkable for Nb-added steel, are superimposed by combined addition of Mg, Ca, and Ga.

(1-f) Furthermore, in order to further exert the effect of increasing internal stress associated with an increase of a dislocation density in grains, which is the effect described in (1-c), combined addition with Sn is effective. Although Sn is a grain boundary segregation element, it is effective in increasing high-temperature strength associated with an increase of internal stress because Sn also actively acts as a solid solution strengthening element in crystal grains in a case of combined addition with B and Nb.

(1-g) Furthermore, in order to enhance oxidation resistance in the aforementioned reformed gas environment containing hydrogen and sulfidized components, it is effective to promote the formation of an Al-based oxide film in the high-temperature reformed gas environment and enhance a protective performance of the film by adjusting contents of Si, Al, Nb, and Mn within a predetermined range. Furthermore, the addition of B, Nb, Sn, Mg, Ca, and Ga to ferritic stainless steel does not impair the oxidation resistance in the reformed gas environment, but rather, the addition of a small amount of Mg and Sn exhibits the effect of further improving the protective performance of the Al-based oxide film and thereby exhibiting oxidation resistance. In the present embodiment, in order to distinguish the two, the surface film before being exposed to the high-temperature reformed gas environment will be described as a "passivation film," and a film in which a composition of the passivation film exposed to the high-temperature reformed gas environment is changed by various reactions will be described as an "Al-based oxide film."

(1-h) The above-mentioned reformed gas environment (carburizing/reducing/sulfidizing environments) easily generates defects in the Al-based oxide film in ferritic stainless steel as compared to a steam oxidation environment not containing atmospheric air or hydrogen. The reason why the reformed gas environment facilitates defect formation in the oxide film is not clear, but it is presumed that sulfides generated under the reformed gas containing sulfidized components have some adverse effect on the oxide film. When a defect occurs in the Al-based oxide film in the reformed gas environment, an exposed base material may oxidize Cr or Fe. Regarding promoting the oxidation in such a reformed gas, the protective performance of the Al-based oxide film can be further enhanced by delaying the external diffusion of Cr and Fe by solid solution of Mg in the Al-based oxide film, and the segregation action of Sn on the surface of the base material. As a result, the oxidation resistance of ferritic stainless steel can be improved.

(1-i) Furthermore, regarding the precipitation of an intermetallic compound a phase (σ brittleness) at high temperature and 475° C. brittleness, which are the drawbacks of Al-containing stainless steel or Si-containing stainless steel of the related art, it has been found that adjusting contents of Cr, Nb, Si, and Al in the component composition is effective. The σ brittleness and the 475° C. brittleness are derived from generation of an intermetallic compound mainly containing Cr and containing Si and Al, and a generation site thereof is a crystal grain boundary in many cases. That is, in order to inhibit the σ brittleness and 475° C. brittleness, it can be said that it is effective to inhibit generation of the intermetallic compound itself and reduce the generation site thereof.

The inventors of the present invention have further studied these, and as a result, found that it is possible to stabilize the structure by inhibiting the generation of the intermetallic compound itself by limiting the amount of Cr and by inhibiting the generation site by segregation of Nb to a crystal grain boundary, and thereby the σ brittleness and 475° C. brittleness can be inhibited. Furthermore, since the generation of the intermetallic compound containing Si and Al can be inhibited by limiting the amount of Cr and adding Nb, amounts of Si and Al that contribute to the oxidation resistance described in (1-h) can be secured, and thereby it is also possible to achieve both oxidation resistance and structural stability.

As described above, new findings are obtained in which, in the ferritic stainless steel of the first aspect, by combined addition of B, Nb, Sn, Mg, Ca, and Ga, it is possible to impart both high-temperature strength, which is important to durability, and oxidation resistance in the reformed gas under the carburizing/reducing/sulfidizing environments. Furthermore, new findings are obtained in which, in the ferritic stainless steel, by optimizing contents of Cr, Nb, Si, and Al, it is possible to inhibit σ brittleness and 475° C. brittleness by improving structural stability, and at the same time, it is also possible to achieve oxidation resistance.

Hereinafter, an embodiment of the ferritic stainless steel of the first aspect will be described.

<Component Composition>

First, the reasons for limiting components will be described below. The symbol "%" of the content of each element means "mass %."

Cr is a basic constituent element for ensuring high-temperature strength in addition to corrosion resistance. In the present embodiment, when it is less than 12.0%, target high-temperature strength and target oxidation resistance cannot be sufficiently secured. Accordingly, the lower limit of the content of Cr is 12.0% or more and preferably 13.0% or more. However, when exposed to a high-temperature atmosphere, an excessive amount of Cr may promote generation of a σ phase (intermetallic compound of Fe—Cr), which is an embrittlement phase, and may promote cracking during manufacturing. Accordingly, the upper limit of the content of Cr is 16.0% or less from the viewpoint of basic characteristics and manufacturability and preferably 15.0% or less.

C inhibits oxidation resistance by forming a solid solution or Cr carbide in a ferrite phase. Accordingly, the upper limit of an amount of C is set to 0.020% or less and preferably 0.015% or less. However, excessive reduction in an amount of C leads to an increase in refining cost, and therefore the lower limit is preferably set to 0.001% or more and more preferably 0.005% or more from the viewpoint of oxidation resistance and manufacturability.

Si is an important element for ensuring oxidation resistance. Si may slightly form a solid solution in an Al-based oxide film, and also concentrates immediately beneath the Al-based oxide film/steel interface, thereby improving oxidation resistance under the reformed gas environment. In order to obtain these effects, the lower limit is preferably 0.50% or more and more preferably 0.70% or more.

On the other hand, when Si is contained excessively, it may deteriorate the toughness and workability of steel and inhibit formation of an Al-based oxide film, and therefore, the upper limit is set to 2.50% or less and preferably 1.70% or less from the viewpoint of oxidation resistance and basic characteristics.

Mn may form a solid solution with Si in the Al-based oxide film or immediately beneath the Al-based oxide film in the reformed gas environment, thereby improving the protective performance of the film and contributing to the improvement of oxidation resistance. In order to obtain these effects, the lower limit is preferably 0.10% or more and more preferably 0.20% or more. On the other hand, when Mn is contained excessively, it impairs corrosion resistance of steel and the formation of a Ti- or Al-based oxide film, and therefore, the upper limit is set to 1.00% or less and preferably 0.90% or less from the viewpoint of oxidation resistance and basic characteristics.

Al is a deoxidizing element, and furthermore, is an essential element that contributes to the improvement of oxidation resistance by forming an Al-based oxide film in the reformed gas in the present embodiment. In the present embodiment, an amount thereof is preferably 1.00% or more and more preferably 1.50% or more in order to obtain favorable oxidation resistance. However, if Al is excessively contained, toughness and weldability of steel deteriorate and productivity is impaired. Therefore, there is a problem in economic efficiency as well as an increase in alloy cost. Accordingly, the upper limit of an amount of Al is set to 2.50% or less from the viewpoint of basic characteristics and economic efficiency and more preferably 2.30% or less.

P is an element that impairs manufacturability and weldability, and the lower the content thereof, the better. Therefore, the upper limit is set to 0.050% or less. However, excessive reduction of P leads to an increase in refining cost, and therefore the lower limit is preferably set to 0.003%. A preferable range is 0.005% to 0.040% and is more preferably 0.010% to 0.030% from the viewpoint of manufacturability and weldability.

S is an impurity element that is unavoidably contained in steel, and deteriorates high-temperature strength and oxidation resistance. In particular, grain boundary segregation of S, Mn-based inclusions, and the presence of a solid solution S have an action of deteriorating the high-temperature strength and oxidation resistance. Accordingly, the lower an amount of S, the better. Therefore, the upper limit is set to 0.0030% or less.

However, excessive reduction of S leads to an increase in raw material and refining costs, and therefore the lower limit is preferably set to 0.0001% or more. A preferable range is 0.0001% to 0.0020% and is more preferably 0.0002% to 0.0010% from the viewpoint of manufacturability and oxidation resistance.

Similar to C, N is an element that impairs oxidation resistance. Accordingly, the smaller an amount of N, the better, and therefore the upper limit is set to 0.030% or less. However, excessive reduction of N leads to an increase in refining cost, and therefore the lower limit is preferably set to 0.002% or more. A preferable range of an amount of N is 0.005% to 0.020% from the viewpoint of oxidation resistance and manufacturability.

Nb is a stabilizing element that fixes C and N, and it is possible to improve oxidation resistance and corrosion resistance through purification of steel by this action. Furthermore, in the present embodiment, it is an element that effectively improves high-temperature strength by the action effect of co-segregation at a grain boundary with B. Furthermore, regarding an intermetallic compound, which causes σ brittleness and 475° C. brittleness, precipitation proceeds mainly at crystal grain boundaries as generation sites, but Nb segregates to the crystal grain boundaries to reduce the generation sites. Accordingly, the stability of the structure is increased, and as a result, σ brittleness and 475° C. brittleness can be inhibited. In order to obtain these effects, the lower limit of an amount of Nb is 0.001% or more and preferably 0.15% or more. On the other hand, excessive incorporation of Nb leads to an increase in alloy cost and impairs manufacturability, and therefore the upper limit of an amount of Nb is set to 1.00% or less and preferably 0.60% or less.

B, Sn, Ga, Mg, and Ca are elements capable of further exhibiting the effect of increasing the high-temperature strength, as described in the above findings (e) and (f). Furthermore, these elements are also elements that promote the formation of an Al-based oxide film and thereby contribute to the improvement of oxidation resistance. For this reason, in addition to the above-mentioned component composition, one or more of B, Sn, Ga, Mg, and Ca are contained.

B can delay grain boundary slip by segregating at grain boundaries, and can also enhance a 0.2% proof stress by increasing internal stress associated with an increase of a dislocation density in crystal grains. Sn, Ga, Mg, and Ca concentrate in the vicinity of the surface and thereby have the action of promoting selective oxidation of Al. In order to obtain such effects, it is preferable that the lower limit of each content of B, Ga, Mg, and Ca be set to 0.0002% or more, and the lower limit of Sn be set to 0.005% or more. On the other hand, excessive incorporation of these elements not only increases the refining cost of steel, but also deteriorates manufacturability and corrosion resistance of steel. Accordingly, the upper limit of the content of Ca is set to 0.0100% or less, the upper limit of the content of Sn is set to 0.20% or less, and the upper limit of each content of B, Ga, and Mg is set to 0.0200% or less.

Furthermore, the component composition of the present embodiment satisfies Expression (1).

$$10(B+Ga)+Sn+Mg+Ca>0.020 \qquad \text{Expression (1)}$$

Each of the element symbols in Expression (1) indicates the content (mass %) of each of the elements in the steel.

From the viewpoint of improving high-temperature strength and oxidation resistance, Expression (1) is preferably 0.025% or more, and is more preferably 0.035% or more. The upper limit of Expression (1) is not particularly limited by the upper limits of B, Sn, Ga, Mg, and Ca, but is preferably 0.2% from the viewpoint of high-temperature strength and manufacturability.

Next, the concentration (mass %) of the segregation element in crystal grain boundaries will be described.

As described in the above findings (1-c) and (1-d), in the present embodiment, high-temperature strength can be improved by co-segregating Nb and B at crystal grain boundaries. In addition, similarly, Sn being segregated to grain boundaries can also inhibit grain boundary slip, thereby improving the high-temperature strength. From these viewpoints, in the ferritic stainless steel according to the present embodiment, the concentration of Nb at crystal grain boundaries (grain boundary concentration) is preferably 3.0% or more. When Sn is contained, a grain boundary concentration of Sn is preferably 1.0% or more. On the other hand, excessive grain boundary segregation of Nb and Sn may cause crystal grain boundaries to act as fracture origin points and impair manufacturability, and may also cause a decrease in high-temperature strength. Therefore, a grain boundary concentration of Nb is preferably 10.0% or less, and a grain boundary concentration of Sn is preferably 5.0% or less.

The concentration of Nb and the concentration of Sn in crystal grain boundaries can be adjusted by performing a heat treatment under predetermined conditions after final annealing. Details thereof will be described later.

The concentration of Nb and the concentration of Sn at crystal grain boundaries can be measured by Auger Electron Spectrometry (AES).

First, a notched test piece (0.8 t×4 w×20 L (mm)) is taken from any portion of a primary phase other than an oxide film. Next, the notched test piece is cooled with liquid nitrogen in a vacuum (vacuum degree: $10^{-6}$ MPa), and then the test piece is fractured from the notched portion to expose the fracture surface. AES analysis is performed on crystal grain boundaries on the exposed fracture surface, the Auger electron spectrum is measured in an energy range of 0 to 1,000 eV, and the detected element is identified (qualitative analysis). Furthermore, the detected element is quantified (quantitative analysis) using the obtained peak intensity ratio (relative sensitivity coefficient method). By the above method, concentrations of the elements (Nb, Sn) segregated at the crystal grain boundaries can be obtained.

The ferritic stainless steel according to the present embodiment is composed of Fe and impurities in addition to the above-mentioned elements (the balance), but it can also contain any element to be described later. Accordingly, the lower limit of the content of each of Ni, Cu, Mo, Sb, W, Co, V, Ti, Zr, La, Y, Hf, and REM is 0% or more.

The term "impurities" in the present embodiment refers to components, which are mixed due to various factors in a manufacturing step, including raw materials such as ores and scraps in industrial manufacture of steel, and includes inevitably mixed components.

If necessary, the ferritic stainless steel of the present embodiment may contain one or more of Ni: 1.0% or less, Cu: 1.0% or less, Mo: 1.0% or less, Sb: 0.5% or less, W: 1.0% or less, Co: 0.5% or less, V: 0.5% or less, Ti: 0.5% or less, Zr: 0.5% or less, La: 0.1% or less, Y: 0.1% or less, Hf: 0.1% or less, and REM: 0.1% or less.

Ni, Cu, Mo, Sb, W, Co, V, and Ti are elements effective for enhancing the high-temperature strength and corrosion resistance of steel, and they may be contained if necessary. However, if they are excessively incorporated, they lead to an increase in alloy cost and impair manufacturability, and therefore the upper limits of Ni, Cu, and W are set to 1.0% or less. Since Mo is an element that is also effective in inhibiting high-temperature deformation due to a decrease in a thermal expansion coefficient, it is preferably contained at the upper limit of 1.0% or less. Sb is an element that concentrates in the vicinity of a steel surface, promotes selective oxidation of Al, and thereby has the effect of improving corrosion resistance, and therefore is preferably contained at the upper limit of 0.5% or less. The upper limit of Co, Ti, and V is 0.5% or less. The lower limit of the preferable content of any element of Ni, Cu, Mo, W, Co, and V is 0.10% or more. The lower limit of the preferable content of Sb and Ti is 0.01% or more.

Zr, La, Hf, and REM are conventionally effective elements for improving hot workability and cleanliness of steel, and improving oxidation resistance, and may be incorporated as necessary. However, from the technical idea of the present invention and the reduction of alloy cost, it is not possible to rely on the effect of adding these elements. When Zr, La, Y, Hf, and REM are contained, the upper limit of Zr is 0.5% and the upper limit of each of La, Y, Hf, and REM is 0.1%. The more preferable lower limit of Zr is 0.01%, and the preferable lower limit of each of La, Y, Hf, and REM is 0.001%. REM is an element belonging to atomic numbers 58 to 71 excluding La and Y, and Sc (scandium), and is, for example, Ce, Pr, Nd, or the like. In addition, REM in the present embodiment is composed of one or more elements selected from elements belonging to atomic numbers 58 to 71 and Sc, and an amount of REM is a total amount of these elements.

The ferritic stainless steel according to the present embodiment is composed of Fe and impurities (including unavoidable impurities) in addition to the above-described elements, but can contain other elements in addition to the above-described elements as long as the effects of the present invention are not impaired. In addition to the above-mentioned P and S, which are general impurity elements, it is preferable to reduce Bi, Se, and the like as much as possible. Meanwhile, the content ratio of these elements is controlled within the limit of solving the problem of the present invention, and if necessary, one or more of Bi≤100 ppm and Se≤100 ppm may be contained.

A metallographic structure of the ferritic stainless steel of the present embodiment is a ferrite single-phase structure. This means that the steel sheet does not have an austenite phase or a martensite structure. When an austenite phase or a martensite structure is included, a metallographic structure is set to a ferrite single-phase structure, because a raw material cost becomes high, and a decrease in yield due to edge cracking occurs during manufacturing. Although precipitates such as carbonitrides exist in the steel, these precipitates are not taken into account because they do not significantly affect the effects of the present invention, and the above description is regarding a structure of a primary phase.

The shape of the ferritic stainless steel of the present embodiment is not particularly limited, and it may be plate-shaped, tubular, rod-shaped, or the like, and may be appropriately determined according to size, form, and shape of a member.

<Manufacturing Method>

Next, regarding a method for manufacturing the ferritic stainless steel according to the embodiment of the first aspect described above, the ferritic stainless steel can be manufactured by combining hot working, cold working, and each heat treatment (annealing), and if necessary, acid washing and descaling may be appropriately performed. As an example of the manufacturing method, it is possible to adopt a manufacturing method including the steps of steelmaking-hot rolling-annealing-cold rolling-annealing (final annealing), and a heat treatment after the hot rolling is preferably performed at a temperature higher than 700° C.

For example, the heat treatment after the hot rolling may be performed at a temperature higher than 700° C., cold rolling may be performed after descaling, and then final annealing and descaling may be performed at a temperature higher than 700° C. to obtain a cold rolled annealed plate. In addition, a rolling reduction rate of cold rolling is not particularly limited, but is preferably in a range of 30% to 80%.

Furthermore, when ferritic stainless steel is applied to gas pipe applications, it includes welded pipes manufactured from steel sheets, but the pipes are not limited to welded pipes, and seamless pipes manufactured by hot working may be used.

The temperature of the heat treatment after the hot working (hot-band annealing) and the final annealing after the cold rolling is higher than 700° C., and this is to recrystallize the steel to form a solid solution of Nb and Sn, which are effective for increasing high-temperature strength.

However, an excessive temperature rise of each treatment temperature of heat treatment after hot working and final annealing after cold rolling leads to coarsening of crystal grain size, leading to deterioration of surface quality such as surface roughening. Accordingly, the upper limit of each treatment temperature of the heat treatment after hot working and final annealing after cold rolling is preferably 1,050° C. or lower.

After the final annealing, it is desirable to further perform a heat treatment (heat treatment after final annealing) in order to adjust the concentration of Nb and Sn in crystal grain boundaries within the above-mentioned range to increase the high-temperature strength. Specifically, after final annealing, a heat treatment may be performed in a manner in which reheating is performed at 600° C. to 700°

C. and a temperature is retained for longer than 1 minute and for 3 hours or shorter. The term "retention" in the present embodiment may be a state in which a constant temperature is retained, or may be a state in which a temperature varies within a range, as long as the temperature is in the range of 600° C. to 700° C. That is, if a time during which the steel sheet exists between 600° C. and 700° C. is longer than 1 minute and 3 hours or shorter, it does not matter whether or not the temperature of the steel sheet changes during that time. In addition, the temperature of the steel sheet in the present embodiment refers to the temperature of a steel sheet surface.

If the heat treatment temperature after final annealing is higher than 700° C., or if a retention time for the heat treatment after final annealing is longer than 3 hours, a coarse Laves phase ($Fe_2Nb$) having a long side of more than 1 μm tends to precipitate, and high-temperature strength may deteriorate. Therefore, the upper limit of the heat treatment temperature after final annealing is 700° C. or shorter, and the retention time is 3 hours or shorter. On the other hand, if the heat treatment temperature after final annealing is lower than 600° C., or if the retention time of the heat treatment after final annealing is 1 minute or shorter, grain boundary segregation of Nb and Sn does not proceed, and sufficient high-temperature strength cannot be obtained. In addition, σ phase precipitation or 475° C. brittleness may occur due to a decrease in grain boundary strength or instability of the structure. Therefore, the lower limit of the heat treatment temperature after final annealing is 600° C. or higher, and the retention time is longer than 1 minute.

The control of grain boundary concentrations of Nb and Sn can be adjusted in the step of final annealing without performing the heat treatment after final annealing. In this case, during the cooling of the final annealing, that is, when heating to over 700° C. and then cooling, a passage time (cooling required time) in the temperature range of 600° C. to 700° C. is controlled to be longer than 1 minute. Specifically, the passage time between the temperatures can be controlled by adjusting a cooling rate between the temperatures of 600° C. to 700° C.

The atmosphere for the heat treatment after hot working, final annealing, and the heat treatment after final annealing is not particularly specified, but is preferably atmospheric air, an LNG fuel atmosphere, a non-oxidizing atmosphere formed of hydrogen, nitrogen, argon, or the like (bright annealing).

[Second Aspect]

(2-a) In general, in order to prevent deformation of a structure operating at a high-temperature range around 750° C. to 800° C., which is regarded as a problem, it is effective to increase high-temperature strength, particularly a 0.2% proof stress of ferritic stainless steel as a material at around 750° C. and to inhibit a decrease of the 0.2% proof stress at around 800° C.

(2-b) It is found that the increase and the inhibition of a decrease of the 0.2% proof stress at a high-temperature range are not affected by excessive addition of Al, or addition of Mo, Cu, and the like, which contribute to solid solution strengthening/precipitation strengthening, but are remarkably improved by the addition of small amounts of B, Nb, Sn, Mg, Ca, and Ga and adjustment of the amounts added. That is, new findings are obtained in which, by adding small amounts of these elements in ferritic stainless steel, it is possible to achieve characteristics in which a 0.2% proof stress at around 750° C. is increased and a decrease of the 0.2% proof stress at around 800° C. is inhibited. Although there are still many unclear points regarding such an action of improving high-temperature strength, the action mechanism described below based on experimental findings is inferred.

(2-c) Addition of a small amount of B has effects of contributing to an increase of proof stress and tensile strength at 750° C. to 800° C. to a considerable extent, and significantly improving particularly a 0.2% proof stress. The addition of a small amount of B has effects of inhibiting generation of cavities (nano-sized gaps) starting from crystal grain boundaries due to boundary segregation of B, and thereby delaying grain boundary sliding, and increasing internal stress associated with an increase of a dislocation density in crystal grains. Furthermore, new findings in which the effects of B are remarkable for Nb-added steel are found.

(2-d) The above-described effects of B, which are remarkable for Nb-added steel, are superimposed by combined addition of Mg, Ca, and Ga. Mg and Ca generate non-metallic inclusions and sulfides, enhance the cleanliness of crystal grain boundaries to promote grain boundary segregation of B, and thereby more efficiently exhibit the above-described effects of B. Furthermore, since Ga also improves the cleanliness of steel, the above-mentioned effects of B can be efficiently exhibited by combined addition of B.

(2-e) Furthermore, in order to further exert the effect of increasing internal stress associated with an increase of a dislocation density in grains, which is the effect described in (2-c), combined addition with Sn is effective. Although Sn is a grain boundary segregation element, it is effective in increasing high-temperature strength associated with an increase of internal stress because Sn also acts as a solid solution strengthening element in crystal grains in a case of combined addition of B.

(2-f) Furthermore, in order to enhance oxidation resistance in the aforementioned reformed gas environment containing hydrogen and sulfidized components, it is effective to promote the formation of an Al-based oxide film in the high-temperature reformed gas environment and enhance a protective performance of the film by adjusting contents of Si, Al, Nb, and Mn within a predetermined range. Furthermore, the addition of B, Nb, Sn, Mg, Ca, and Ga to ferritic stainless steel does not impair the oxidation resistance in the reformed gas environment, but rather, the addition of a small amount of Mg and Sn exhibits the effect of further improving the protective performance of the Al-based oxide film and thereby exhibiting oxidation resistance. In the present embodiment, in order to distinguish the two, the surface film before being exposed to the high-temperature reformed gas environment will be described as a "passivation film," and a film in which a composition of the passivation film exposed to the high-temperature reformed gas environment is changed by various reactions will be described as an "Al-based oxide film."

(2-g) The above-mentioned reformed gas environment (carburizing/reducing/sulfidizing environments) easily generates defects in the Al-based oxide film in ferritic stainless steel as compared to a steam oxidation environment not containing atmospheric air or hydrogen. The reason why the reformed gas environment facilitates defect formation in the oxide film is not clear, but it is presumed that sulfides generated under the reformed gas containing sulfidized components have some adverse effect on the oxide film. When a defect occurs in the Al-based oxide film in the reformed gas environment, an exposed base material may oxidize Cr or Fe. Regarding promoting the oxidation in such a reformed gas, the protective performance of the Al-based oxide film can be further enhanced by delaying the external diffusion of Cr and Fe by solid solution of Mg in the Al-based oxide film, and the segregation action of Sn on the surface of the base material. As a result, the oxidation resistance of ferritic stainless steel can be improved.

(2-h) Furthermore, regarding improvement of a 0.2% proof stress in the high-temperature range described above, it is found that it is very effective to control an area ratio of {111}±10° oriented grains and {110}±10° oriented grains in the texture, specifically, the recrystallization texture in a central part of the steel sheet. That is, new findings is obtained, in which, in order to increase a 0.2% proof stress at around 750° C. and inhibit a decrease of the 0.2% proof stress at around 800° C. in ferritic stainless steel, controlling an area ratio of the recrystallization texture in the steel sheet to an appropriate range is very effective, in addition to adding small amounts of elements as described above.

(2-i) Furthermore, regarding the precipitation of an intermetallic compound a phase (σ brittleness) at high temperature and 475° C. brittleness, which are the drawbacks of Al-added stainless or Si-added stainless steel of the related art, it has been found that adjusting contents of Cr, Si, Nb, and Al in the component composition is effective. The σ brittleness and the 475° C. brittleness are derived from generation of an intermetallic compound mainly containing Cr and containing Si and Al, and a generation site thereof is a crystal grain boundary in many cases. That is, in order to inhibit the σ brittleness and 475° C. brittleness, it can be said that it is effective to inhibit generation of the intermetallic compound itself and reduce the generation site thereof. The inventors of the present invention have further studied these, and as a result, found that it is possible to stabilize the structure by inhibiting the generation of the intermetallic compound itself by limiting the amount of Cr and by inhibiting the generation site by segregation of Nb to a crystal grain boundary, and thereby the σ brittleness and 475° C. brittleness can be inhibited. Furthermore, since the generation of the intermetallic compound containing Si and Al can be inhibited by limiting the amount of Cr and adding Nb, amounts of Si and Al that contribute to the oxidation resistance described in (2-h) can be secured, and thereby it is also possible to achieve both oxidation resistance and structural stability.

As described above, new findings are obtained in which, in the ferritic stainless steel sheet of the second aspect, by combined addition of B, Ga, Mg, Ca, and Sn, and by control of an area ratio of the recrystallization texture within an appropriate range, it is possible to impart both high-temperature strength, which is important to durability, and oxidation resistance in the reformed gas under the carburizing/reducing/sulfidizing environments. Furthermore, new findings are obtained in which, in the ferritic stainless steel, by optimizing contents of Cr, Nb, Si, and Al, it is possible to inhibit σ brittleness and 475° C. brittleness by improving structural stability, and at the same time, it is also possible to achieve oxidation resistance.

Hereinafter, an embodiment of the ferritic stainless steel of the second aspect will be described.

<Component Composition>

First, the reasons for limiting components will be described below. The symbol "%" of the content of each element means "mass %."

Cr is a basic constituent element for ensuring high-temperature strength in addition to corrosion resistance. In the present embodiment, when it is less than 12.0%, target high-temperature strength and target oxidation resistance cannot be sufficiently secured. Accordingly, the lower limit of the content of Cr is 12.0% or more and preferably 13.0% or more. However, when exposed to a high-temperature atmosphere, an excessive amount of Cr may promote generation of a σ phase (intermetallic compound of Fe—Cr), which is an embrittlement phase, and may promote cracking during manufacturing. Accordingly, the upper limit of the content of Cr is 16.0% or less from the viewpoint of basic characteristics and manufacturability and preferably 15.0% or less.

C inhibits oxidation resistance by forming a solid solution or Cr carbide in a ferrite phase. Accordingly, the upper limit of an amount of C is set to 0.020% or less and preferably 0.015% or less. However, excessive reduction in an amount of C leads to an increase in refining cost, and therefore the lower limit is preferably set to 0.001% or more and more preferably 0.005% or more from the viewpoint of oxidation resistance and manufacturability.

Si is an important element for ensuring oxidation resistance. Si may slightly form a solid solution in an Al-based oxide film, and also concentrates immediately beneath the Al-based oxide film/steel interface, thereby improving oxidation resistance under the reformed gas environment. In order to obtain these effects, the lower limit is preferably 0.50% or more.

It is more preferably 0.70% or more. On the other hand, when Si is contained excessively, it may deteriorate the toughness and workability of steel and inhibit formation of an Al-based oxide film, and therefore, the upper limit is set to 2.50% or less and preferably 1.70% or less from the viewpoint of oxidation resistance and basic characteristics.

Mn may form a solid solution with Si in the Al-based oxide film or immediately beneath the Al-based oxide film in the reformed gas environment, thereby improving the protective performance of the film and contributing to the improvement of oxidation resistance. In order to obtain these effects, the lower limit is preferably 0.10% or more and more preferably 0.20% or more. On the other hand, when Mn is contained excessively, it impairs corrosion resistance of steel and the formation of a Ti- or Al-based oxide film, and therefore, the upper limit is set to 1.00% or less and preferably 0.90% or less from the viewpoint of oxidation resistance and basic characteristics.

Al is a deoxidizing element, and furthermore, is an essential element that contributes to the improvement of oxidation resistance by forming an Al-based oxide film in the reformed gas in the present embodiment. In the present embodiment, an amount thereof is preferably 1.00% or more and more preferably 1.50% or more in order to obtain favorable oxidation resistance. However, if Al is excessively contained, toughness and weldability of steel deteriorate and productivity is impaired. Therefore, there is a problem in economic efficiency as well as an increase in alloy cost. Accordingly, the upper limit of an amount of Al is set to 2.50% or less from the viewpoint of basic characteristics and economic efficiency and more preferably 2.30% or less.

P is an element that impairs manufacturability and weldability, and the lower the content thereof, the better. Therefore, the upper limit is set to 0.050% or less. However, excessive reduction of P leads to an increase in refining cost, and therefore the lower limit is preferably set to 0.003%. A preferable range is 0.005% to 0.040% and is more preferably 0.010% to 0.030% from the viewpoint of manufacturability and weldability.

S is an impurity element that is unavoidably contained in steel, and deteriorates high-temperature strength and oxidation resistance. In particular, grain boundary segregation of S, Mn-based inclusions, and the presence of a solid solution S have an action of deteriorating the high-temperature strength and oxidation resistance. Accordingly, the lower an amount of S, the better. Therefore, the upper limit is set to 0.0030% or less.

However, excessive reduction of S leads to an increase in raw material and refining costs, and therefore the lower limit is preferably set to 0.0001% or more. A preferable range is 0.0001% to 0.0020% and is more preferably 0.0002% to 0.0010% from the viewpoint of manufacturability and oxidation resistance.

Similar to C, N is an element that impairs oxidation resistance. Accordingly, the smaller an amount of N, the better, and therefore the upper limit is set to 0.030% or less. However, excessive reduction leads to an increase in refining cost, and therefore the lower limit is preferably set to 0.002% or more. A preferable range is 0.005% to 0.020% from the viewpoint of oxidation resistance and manufacturability.

Nb is a stabilizing element that fixes C and N, and it is possible to improve oxidation resistance and corrosion resistance through purification of steel by this action. Furthermore, in the present embodiment, it is an element that effectively acts for controlling the texture and enhancing the high-temperature strength. Furthermore, regarding an intermetallic compound, which causes σ brittleness and 475° C. brittleness, precipitation proceeds mainly at crystal grain boundaries as generation sites, but Nb segregates to the crystal grain boundaries to reduce the generation sites. Accordingly, the stability of the structure is increased, and as a result, σ brittleness and 475° C. brittleness can be inhibited. In order to obtain these effects, the lower limit of an amount of Nb is 0.001% or more and is preferably 0.15% or more. On the other hand, excessive incorporation of Nb leads to an increase in alloy cost and impairs manufacturability, and therefore the upper limit of an amount of Nb is set to 1.00% or less and preferably 0.60% or less.

B, Sn, Ga, Mg, and Ca are elements capable of further exhibiting the effect of increasing the high-temperature strength, as described in the above findings (2-d) and (2-e). Furthermore, these elements are also elements that promote the formation of an Al-based oxide film and thereby contribute to the improvement of oxidation resistance. For this reason, in addition to the above-mentioned component composition, one or more of B, Sn, Ga, Mg, and Ca are contained.

B can delay grain boundary slip by segregating at grain boundaries, and can also enhance a 0.2% proof stress by increasing internal stress associated with an increase of a dislocation density in crystal grains. Sn, Ga, Mg, and Ca concentrate in the vicinity of the surface and thereby have the action of promoting selective oxidation of Al. In order to obtain such effects, it is preferable that the lower limit of each content of B, Ga, Mg, and Ca be set to 0.0002% or more, and the lower limit of Sn be set to 0.005% or more. On the other hand, excessive incorporation of these elements not only increases the refining cost of steel, but also deteriorates manufacturability and corrosion resistance of steel. Accordingly, the upper limit of the content of Ca is set to 0.0100% or less, the upper limit of the content of Sn is set to 0.20% or less, and the upper limit of each content of B, Ga, and Mg is set to 0.0200% or less.

Furthermore, the component composition of the present embodiment satisfies Expression (1).

$$10(B+Ga)+Sn+Mg+Ca>0.020 \qquad \text{Expression (1)}$$

Each of the element symbols in Expression (1) indicates the content (mass %) of each of the elements in the steel.

From the viewpoint of improving high-temperature strength and oxidation resistance, Expression (1) is preferably 0.025% or more, and is more preferably 0.035% or more. The upper limit of Expression (1) is not particularly limited by the upper limits of B, Sn, Ga, Mg, and Ca, but is preferably 0.2% from the viewpoint of high-temperature strength and manufacturability.

The ferritic stainless steel according to the present embodiment is composed of Fe and impurities in addition to the above-mentioned elements (the balance), but it can also contain any element to be described later. Accordingly, the lower limit of the content of each of Ni, Cu, Mo, Sb, W, Co, V, Ti, Zr, La, Y, Hf, and REM is 0% or more.

The term "impurities" in the present embodiment refers to components, which are mixed due to various factors in a manufacturing step, including raw materials such as ores and scraps in industrial manufacture of steel, and include inevitably mixed components.

If necessary, the ferritic stainless steel of the present embodiment may contain one or more of Ni: 1.0% or less, Cu: 1.0% or less, Mo: 1.0% or less, Sb: 0.5% or less, W: 1.0% or less, Co: 0.5% or less, V: 0.5% or less, Ti: 0.5% or less, Zr: 0.5% or less, La: 0.1% or less, Y: 0.1% or less, Hf: 0.1% or less, and REM: 0.1% or less.

Ni, Cu, Mo, Sb, W, Co, V, and Ti are elements effective for enhancing the high-temperature strength and corrosion resistance of steel, and they may be contained if necessary. However, if they are excessively incorporated, they lead to an increase in alloy cost and impair manufacturability, and therefore the upper limits of Ni, Cu, and W are set to 1.0% or less. Since Mo is an element that is also effective in inhibiting high-temperature deformation due to a decrease in a thermal expansion coefficient, it is preferably contained at the upper limit of 1.0% or less. Sb is an element that concentrates in the vicinity of a steel surface, promotes selective oxidation of Al, and thereby has the effect of improving corrosion resistance, and therefore is preferably contained at the upper limit of 0.5% or less. The upper limit of Co, Ti, and V is 0.5% or less. The lower limit of the preferable content of any element of Ni, Cu, Mo, W, Co, and V is 0.10% or more. The lower limit of the preferable content of Sb and Ti is 0.01% or more.

Zr, La, Hf, and REM are conventionally effective elements for improving hot workability and cleanliness of steel, and improving oxidation resistance, and may be added as necessary. However, from the technical idea of the present invention and the reduction of alloy cost, it is not possible to rely on the effect of adding these elements. When the elements are added, the upper limit of Zr is 0.5% and the upper limit of each of La, Y, Hf, and REM is 0.1%. The more preferable lower limit of Zr is 0.01%, and the preferable lower limit of each of La, Y, Hf, and REM is 0.001%. REM is an element belonging to atomic numbers 58 to 71 excluding La and Y, and Sc (scandium), and is, for example, Ce, Pr, Nd, or the like. In addition, REM in the present embodiment is composed of one or more elements selected from elements belonging to atomic numbers 58 to 71 and Sc, and an amount of REM is a total amount of these elements.

The ferritic stainless steel according to the present embodiment is composed of Fe and impurities (including unavoidable impurities) in addition to the above-described elements, but can contain other elements in addition to the above-described elements as long as the effects of the present invention are not impaired. In addition to the above-mentioned P and S, which are general impurity elements, it is preferable to reduce Bi, Se, and the like as much as possible. Meanwhile, the content ratio of these elements is controlled within the limit of solving the problem of the present invention, and if necessary, one or more of Bi≤100 ppm and Se≤100 ppm may be contained.

A metallographic structure of the ferritic stainless steel sheet of the present embodiment is a ferrite single-phase structure.

This means that the steel sheet does not have an austenite phase or a martensite structure. When an austenite phase or a martensite structure is included, a metallographic structure is set to a ferrite single-phase structure, because a raw material cost becomes high, and a decrease in yield to edge cracking occurs during manufacturing. Although precipitates such as carbonitrides exist in the steel, these precipitates are not taken into account because they do not significantly affect the effects of the present invention, and the above description is regarding a structure of a primary phase.

<Texture>

The ferritic stainless steel sheet according to one embodiment of the second aspect satisfies the following (A) and (B) with respect to the recrystallization texture in order to enhance high-temperature strength.

(A) In the plate thickness middle portion, an area ratio of $\{111\}\pm10°$ oriented grains, in which an angle difference between a normal direction of a steel sheet surface and a $\{111\}$ plane orientation is within 10°, is more than 20.0% and less than 60.0%.

(B) In the plate thickness middle portion, an area ratio of $\{110\}\pm10°$ oriented grains, in which an angle difference between a normal direction of a steel sheet surface and a $\{110\}$ plane orientation is within 10°, is more than 0.5% and less than 5.0%.

The $\{111\}\pm10°$ oriented grains are the main texture among recrystallization textures, but it has been found that it is effective to secure a predetermined amount of $\{110\}\pm10°$ oriented grains that are the structure in which the grain size is smaller than that of the $\{111\}\pm10°$ oriented grains, in order to increase the high-temperature strength, particularly a 0.2% proof stress. That is, it is presumed that, in the plate thickness middle portion, by including an area ratio of $\{110\}\pm10°$ oriented grains to more than 0.5% and less than 5%, slip of the crystal grain boundaries of $\{111\}\pm10°$ oriented grains is delayed, which contributes to the increase of the dislocation density near the crystal grain boundaries, and as a result, the 0.2% proof stress can be improved.

The area ratio of $\{110\}\pm10°$ oriented grains is more than 0.5%, and is preferably 0.7% or more, from the viewpoint of enhancing high-temperature strength. In order to promote the generation of $\{110\}\pm10°$ oriented grains, it is effective to increase a rolling reduction rate during cold rolling, but when the generation of $\{110\}\pm10°$ oriented grains is promoted excessively, there is a possibility that the rolling reduction rate increases and manufacturability deteriorates. Furthermore, even when an area ratio of $\{110\}\pm10°$ oriented grains is excessively increased, the effect of improving high-temperature strength is saturated. Based on the above, the upper limit of the area ratio of $\{110\}\pm10°$ oriented grains is set to less than 5.0%, preferably 4.0% or less.

The area ratio of $\{111\}\pm10°$ oriented grains has the lower limit of more than 20.0% to prevent deterioration of workability, and the upper limit of less than 60.0% to prevent deterioration of manufacturability. From the viewpoint of achieving both workability and manufacturability, a preferable range is 30.0% to 55.0%, and a more preferable range is 35.0% to 50.0%.

The term "$\{111\}\pm10°$ oriented grain" represents a crystal grain having a crystal orientation in which an angle difference between a normal direction of the steel sheet surface in the plate thickness middle portion and the $\{111\}$ plane orientation is within 10° (where an allowable angle range is 0° to 10°). The term "$\{110\}\pm10°$ oriented grain" represents a crystal grain having a crystal orientation in which an angle difference between a normal direction of the steel sheet surface in the plate thickness middle portion and the $\{110\}$ plane orientation is within 10° (where an allowable angle range is 0° to) 10°.

Furthermore, the term "plate thickness middle portion" is a region including the center of the plate thickness t of the steel sheet, that is, the position of (½)t, and preferably refers to a region from the center of the plate thickness t of the steel sheet up to a plate thickness of ⅛ t toward both surfaces of the steel sheet.

The area ratio of $\{111\}\pm10°$ oriented grains and $\{110\}\pm10°$ oriented grains can be analyzed using an electron beam backscattering diffraction method (hereinafter, EBSD method). The EBSD method is to measure and analyze crystal orientation of each crystal grain in a micro-region on a sample surface at high speed.

For example, in a plane (L cross-section) parallel to the steel sheet surface at the plate thickness middle portion, using a scanning electron microscope and an EBSD detector, EBSD is measured at a measurement region of a plate width direction of 850 μm and a rolling direction of 2,250 μm with a magnification of 100. Next, using EBSD analysis software OIM-Analysis (manufactured by TSL), and the EBSD measurement data, an area ratio can be calculated by displaying a crystal orientation map of crystal grains in which an angle difference between the normal direction of the plane parallel to the steel sheet surface and the $\{111\}$ plane orientation is within 10° (that is, $\{111\}\pm10°$ oriented grains). The area ratio of $\{110\}\pm10°$ oriented grains can be obtained by the same method.

<Manufacturing Method>

Next, regarding a method for manufacturing the ferritic stainless steel sheet according to the embodiment of the second aspect described above, the ferritic stainless steel sheet can be manufactured by combining hot working, cold working, and each heat treatment (annealing), and if necessary, acid washing and descaling may be appropriately performed. That is, as an example of the manufacturing method, it is possible to adopt a manufacturing method including the steps of steelmaking-hot rolling-annealing-cold rolling-annealing (final annealing), and a heat treatment after the hot rolling may not be performed, or it may be performed at 700° C. or lower. For example, the heat treatment after the hot rolling may not be performed, and cold rolling may be performed after descaling, and then final annealing and descaling may be performed to obtain a cold rolled annealed plate. In addition, a rolling reduction rate of cold rolling is within a range of 30% to 80%.

Furthermore, when a ferritic stainless steel sheet is applied to gas pipe applications, it includes welded pipes manufactured from steel sheets, but the pipes are not limited to the welded pipes, and seamless pipes manufactured by hot working may be used.

Heat treatment conditions and a cold rolling reduction rate after hot rolling are important in order to control the recrystallization texture as described above, and other steps and conditions may be appropriately determined within a range not impairing the effects of the present invention.

When the heat treatment after hot rolling (hot-band annealing) is performed at a temperature higher than 700°

C., {111}±10° oriented grains are excessively generated, while {110}±10° oriented grains are not sufficiently secured in some cases. In particular, {110}±10° oriented grains are likely to be recrystallized from crystal grain boundaries having high strain energy. Therefore, in order to secure a predetermined amount of {110}±10° oriented grains, the heat treatment after hot rolling is omitted, or cold rolling is performed after the heat treatment is performed at 700° C. or lower, at which strain energy during hot rolling is not eliminated.

Furthermore, when the cold rolling reduction rate is less than 30%, the generation of {110}±10° oriented grains does not proceed. Therefore, in some cases, it is difficult to secure a sufficient amount thereof, and abnormal grain growth occurs after final annealing and thereby the crystal grains become coarse. Furthermore, when the cold rolling reduction rate is more than 80%, the generation of {110}±10° oriented grains can be promoted, but it may impair workability of steel. Considering the productivity of cold rolling and material characteristics, the cold rolling reduction rate is more preferably in a range of 40% to 75%.

In addition, the temperature of final annealing after cold rolling is not particularly specified, but is preferably in a range of 850° C. to 1,000° C.

In the present embodiment, the atmosphere for the hot-band annealing and final annealing is not particularly specified, but is preferably atmospheric air, an LNG fuel atmosphere, a non-oxidizing atmosphere formed of hydrogen, nitrogen, argon, or the like (bright annealing).

[Third Aspect]

(3-a) In general, in order to prevent deformation of a structure operating at a high-temperature range around 750° C. to 800° C., which is regarded as a problem, it is effective to increase high-temperature strength, particularly a 0.2% proof stress of ferritic stainless steel as a material at around 750° C. and to inhibit a decrease of the 0.2% proof stress at around 800° C.

(3-b) It is found that the increase and the inhibition of a decrease of the 0.2% proof stress at a high-temperature range are not affected by excessive addition of Al, or addition of Mo, Cu, and the like, which contribute to solid solution strengthening/precipitation strengthening, but are remarkably improved by the addition of small amounts of B, Nb, Sn, Mg, Ca, and Ga and adjustment of the amounts added. That is, new findings are obtained in which, by adding small amounts of these elements in ferritic stainless steel, it is possible to achieve characteristics in which a 0.2% proof stress at around 750° C. is increased and a decrease of the 0.2% proof stress at around 800° C. is inhibited. Although there are still many unclear points regarding such an action of improving high-temperature strength, the action mechanism described below based on experimental findings is inferred.

(3-c) Addition of a small amount of B has effects of contributing to an increase of proof stress and tensile strength at 750° C. to 800° C. to a considerable extent, and significantly improving particularly a 0.2% proof stress. The addition of a small amount of B has effects of inhibiting generation of cavities (nano-sized gaps) starting from crystal grain boundaries due to boundary segregation of B, and thereby delaying grain boundary sliding, and increasing internal stress associated with an increase of a dislocation density in crystal grains. Furthermore, new findings in which the effects of B are remarkable for Nb-added steel are found.

(3-d) It is well known that addition of Nb is effective in increasing strength in a temperature range up to 750° C. by solid solution strengthening. Precipitation of Nb starts by forming an intermetallic compound called a Laves phase ($Fe_2Nb$) at 750° C. to 800° C., but Nb and B co-segregate at crystal grain boundaries, and thereby the effects of B of (3-c) can be manifested.

(3-e) Furthermore, the above-described effects of B, which are remarkable for Nb-added steel, are superimposed by combined addition of Mg, Ca, and Ga. Mg and Ca generate non-metallic inclusions and sulfides, enhance the cleanliness of crystal grain boundaries to promote grain boundary segregation of B, and thereby more efficiently exhibit the above-described effects of B. Furthermore, since Ga also improves the cleanliness of steel, the above-mentioned effects of B can be efficiently exhibited by combined addition of B.

(3-f) Furthermore, in order to further exert the effect of increasing internal stress associated with an increase of a dislocation density in grains, which is the effect described in (3-c), combined addition with Sn is effective. Although Sn is a grain boundary segregation element, it is effective in increasing high-temperature strength associated with an increase of internal stress because Sn also acts as a solid solution strengthening element in crystal grains in a case of combined addition of B.

(3-g) Furthermore, in order to enhance oxidation resistance in the aforementioned reformed gas environment containing hydrogen and sulfidized components, it is effective to promote the formation of an Al-based oxide film in the high-temperature reformed gas environment and enhance a protective performance of the film by adjusting contents of Si, Al, Nb, and Mn within a predetermined range. Furthermore, the addition of B, Nb, Sn, Mg, Ca, and Ga to ferritic stainless steel does not impair the oxidation resistance in the reformed gas environment, but rather, the addition of a small amount of Mg and Sn exhibits the effect of further improving the protective performance of the Al-based oxide film and thereby exhibiting oxidation resistance. In the present embodiment, in order to distinguish the two, the surface film before being exposed to the high-temperature reformed gas environment will be described as a "passivation film," and a film in which a composition of the passivation film exposed to the high-temperature reformed gas environment is changed by various reactions (refer to (3-i) to be described later) will be described as an "Al-based oxide film."

(3-h) The above-mentioned reformed gas environment (carburizing/reducing/sulfidizing environments) easily generates defects in the Al-based oxide film in ferritic stainless steel as compared to a steam oxidation environment not containing atmospheric air or hydrogen. The reason why the reformed gas environment facilitates defect formation in the oxide film is not clear, but it is presumed that sulfides generated under the reformed gas containing sulfidized components have some adverse effect on the oxide film. When a defect occurs in the Al-based oxide film in the reformed gas environment, an exposed base material may oxidize Cr or Fe. Regarding promoting the oxidation in such a reformed gas, the protective performance of the Al-based oxide film can be further enhanced by delaying the external diffusion of Cr and Fe by solid solution of Mg in the Al-based oxide film, and the segregation action of Sn on the surface of the base material. As a result, the oxidation resistance of ferritic stainless steel can be improved.

(3-i) The above-mentioned oxidation resistance under the reformed gas environment is greatly affected by the passivation film formed on the ferritic stainless steel sheet. In general, after acid washing and polishing, a passivation film mainly composed of Fe—Cr is formed on the surface. The oxidation of Cr is easily promoted when such a passivation film is formed on the surface. As a result of the study conducted by the inventors of the present invention, new findings are obtained in which it is possible to more efficiently inhibit deterioration of oxidation resistance when the plate is exposed to the environment by preliminarily concentrating Cr, Al, and Si in the passivation film and in the region immediately beneath the passivation film (the region from the steel sheet surface to a depth of 30 nm). When Cr is oxidized, it initially exists as $Cr_2O_3$, but this $Cr_2O_3$ inhibits the oxidation of Fe, and $Al^{3+}$ having the same valence substitutes for Cr to change to $Al_2O_3$ (Al-based oxide film). As a result, the formation of an Al-based oxide film is promoted. That is, it is presumed that, by preliminarily concentrating Cr, Al, and Si in the passivation film and immediately beneath the passivation film, it is possible to inhibit the oxidation of Cr and Fe in the reformed gas environment and promote the formation of the Al-based oxide film.

(3-j) Furthermore, in order to preliminarily concentrate Cr, Al, and Si in the passivation film and immediately beneath the passivation film, it is effective to perform a polishing step after cold-band annealing (final annealing), and then perform at least one of a sulfuric acid immersion step or a nitric-hydrofluoric acid immersion step.

(3-k) Furthermore, it is found that, by controlling the existence state of Al and Si in the passivation film, that is, the valences of oxides of both elements, it is possible to more efficiently promote the generation of the Al-based oxide film and improve the oxidation resistance. The valence of the oxide can be obtained by a binding energy difference ($\Delta E$) between an oxide peak and a metal peak. As a result of the study conducted by the inventors of the present invention, new findings are obtained in which the oxidation resistance can be further enhanced by controlling $\Delta E$ of Ai 1 s and Si 1 s within a predetermined range.

(3-1) Furthermore, regarding improvement of a 0.2% proof stress in the high-temperature range described above, it is found that it is very effective to control an area ratio of {111}±10° oriented grains and {110}±10° oriented grains in the texture, specifically, the recrystallization texture in a central part of the steel sheet. That is, new findings is obtained, in which, in order to increase a 0.2% proof stress at around 750° C. and inhibit a decrease of the 0.2% proof stress at around 800° C. in ferritic stainless steel, controlling an area ratio of the recrystallization texture in the steel sheet to an appropriate range is very effective, in addition to adding small amounts of elements as described above.

(3-m) Furthermore, regarding the precipitation of an intermetallic compound 6 phase (σ brittleness) at high temperature and 475° C. brittleness, which are the drawbacks of an Al-added stainless steel or a Si-added stainless steel of the related art, it has been found that adjusting contents of Cr, Si, Nb, and Al in the component composition is effective. The σ brittleness and the 475° C. brittleness are derived from generation of an intermetallic compound mainly containing Cr and containing Si and Al, and a generation site thereof is a crystal grain boundary in many cases. That is, in order to inhibit the σ brittleness and 475° C. brittleness, it can be said that it is effective to inhibit generation of the intermetallic compound itself and reduce the generation site thereof. The inventors of the present invention have further studied these, and as a result, found that it is possible to stabilize the structure by inhibiting the generation of the intermetallic compound itself by limiting the amount of Cr and by inhibiting the generation site by segregation of Nb to a crystal grain boundary, and thereby the σ brittleness and 475° C. brittleness can be inhibited. Furthermore, since the generation of the intermetallic compound containing Si and Al can be inhibited by limiting the amount of Cr and adding Nb, amounts of Si and Al that contribute to the oxidation resistance described in (3-h) can be secured, and thereby it is also possible to achieve both oxidation resistance and structural stability.

As described above, new findings are obtained in which, in the ferritic stainless steel sheet, by combined addition of B, Ga, Mg, Ca, and Sn, by concentration of Cr, Al, and Si in the passivation film or a steel sheet surface layer part immediately beneath the passivation film, and by control of an area ratio of the recrystallization texture within an appropriate range, it is possible to impart both high-temperature strength, which is important to durability, and oxidation resistance in the reformed gas under the carburizing/reducing/sulfidizing environments. Furthermore, new findings are obtained in which, in the ferritic stainless steel, by optimizing contents of Cr, Nb, Si, and Al, it is possible to inhibit σ brittleness and 475° C. brittleness by improving structural stability, and at the same time, it is also possible to achieve oxidation resistance.

Hereinafter, an embodiment of the ferritic stainless steel of the third aspect will be described.

<Component Composition>

First, the reasons for limiting components will be described below. The symbol "%" of the content of each element means "mass %."

Cr is a basic constituent element for ensuring high-temperature strength in addition to corrosion resistance. In the present embodiment, when it is less than 12.0%, target high-temperature strength and target oxidation resistance cannot be sufficiently secured. Accordingly, the lower limit of the content of Cr is 12.0% or more and preferably 13.0% or more. However, when exposed to a high-temperature atmosphere, an excessive amount of Cr may promote generation of a σ phase (intermetallic compound of Fe—Cr), which is an embrittlement phase, and may promote cracking during manufacturing. Accordingly, the upper limit of the content of Cr is 16.0% or less from the viewpoint of basic characteristics and manufacturability as preferably 15.0% or less.

C inhibits oxidation resistance by forming a solid solution or Cr carbide in a ferrite phase. Accordingly, the upper limit of an amount of C is set to 0.020% or less and preferably 0.015% or less. However, excessive reduction in an amount of C leads to an increase in refining cost, and therefore the lower limit is preferably set to 0.001% or more and more preferably 0.005% or more from the viewpoint of oxidation resistance and manufacturability.

Si is an important element for ensuring oxidation resistance. Si may slightly form a solid solution in an Al-based oxide film, and also concentrates immediately beneath the Al-based oxide film/steel interface, thereby improving oxidation resistance under the reformed gas environment. In order to obtain these effects, the lower limit is preferably 0.50% or more.

It is more preferably 0.70% or more. On the other hand, when Si is contained excessively, it may deteriorate the toughness and workability of steel and inhibit formation of an Al-based oxide film, and therefore, the upper limit is set to 2.50% or less and preferably 1.70% or less from the viewpoint of oxidation resistance and basic characteristics.

Mn may form a solid solution with Si in the Al-based oxide film or immediately beneath the Al-based oxide film in the reformed gas environment, thereby improving the protective performance of the film and contributing to the improvement of oxidation resistance. In order to obtain these effects, the lower limit is preferably 0.10% or more and more preferably 0.20% or more. On the other hand, when Mn is contained excessively, it impairs corrosion resistance of steel and the formation of a Ti- or Al-based oxide film, and therefore, the upper limit is set to 1.00% or less and preferably 0.90% or less from the viewpoint of oxidation resistance and basic characteristics.

Al is a deoxidizing element, and furthermore, is an essential element that contributes to the improvement of oxidation resistance by forming an Al-based oxide film in the reformed gas in the present embodiment. In the present embodiment, an amount thereof is preferably 1.00% or more and more preferably 1.50% or more in order to obtain favorable oxidation resistance. However, if Al is excessively contained, toughness and weldability of steel deteriorate and productivity is impaired. Therefore, there is a problem in economic efficiency as well as an increase in alloy cost. Accordingly, the upper limit of an amount of Al is set to 2.50% or less from the viewpoint of basic characteristics and economic efficiency and more preferably 2.30% or less.

P is an element that impairs manufacturability and weldability, and the lower the content thereof, the better. Therefore, the upper limit is set to 0.050% or less. However, excessive reduction of P leads to an increase in refining cost, and therefore the lower limit is preferably set to 0.003%. A preferable range is 0.005% to 0.040% and is more preferably 0.010% to 0.030% from the viewpoint of manufacturability and weldability.

S is an impurity element that is unavoidably contained in steel, and deteriorates high-temperature strength and oxidation resistance. In particular, grain boundary segregation of S, Mn-based inclusions, and the presence of a solid solution S have an action of deteriorating the high-temperature strength and oxidation resistance. Accordingly, the lower an amount of S, the better. Therefore, the upper limit is set to 0.0030% or less.

However, excessive reduction of S leads to an increase in raw material and refining costs, and therefore the lower limit is preferably set to 0.0001% or more. A preferable range is 0.0001% to 0.0020% and is more preferably 0.0002% to 0.0010% from the viewpoint of manufacturability and oxidation resistance.

Similar to C, N is an element that impairs oxidation resistance. Accordingly, the smaller an amount of N, the better, and therefore the upper limit is set to 0.030% or less. However, excessive reduction leads to an increase in refining cost, and therefore the lower limit is preferably set to 0.002% or more. A preferable range is 0.005% to 0.020% from the viewpoint of oxidation resistance and manufacturability.

Nb is a stabilizing element that fixes C and N, and it is possible to improve oxidation resistance and corrosion resistance through purification of steel by this action. Furthermore, in the present embodiment, it is an element that effectively acts for controlling the texture and enhancing the high-temperature strength. Furthermore, regarding an intermetallic compound, which causes σ brittleness and 475° C. brittleness, precipitation proceeds mainly at crystal grain boundaries as generation sites, but Nb segregates to the crystal grain boundaries to reduce the generation sites. Accordingly, the stability of the structure is increased, and as a result, σ brittleness and 475° C. brittleness can be inhibited. In order to obtain these effects, the lower limit of an amount of Nb is 0.001% or more and is preferably 0.15% or more. On the other hand, excessive incorporation of Nb leads to an increase in alloy cost and impairs manufacturability, and therefore the upper limit of an amount of Nb is set to 1.00% or less and preferably 0.60% or less.

B, Sn, Ga, Mg, and Ca are elements capable of further exhibiting the effect of increasing the high-temperature strength, as described in the above findings (3-e) and (3-f). Furthermore, these elements are also elements that promote the formation of an Al-based oxide film and thereby contribute to the improvement of oxidation resistance. For this reason, in addition to the above-mentioned component composition, one or more of B, Sn, Ga, Mg, and Ca are contained.

B can delay grain boundary slip by segregating at grain boundaries, and can also enhance a 0.2% proof stress by increasing internal stress associated with an increase of a dislocation density in crystal grains. Sn, Ga, Mg, and Ca concentrate in the vicinity of the surface and thereby have the action of promoting selective oxidation of Al. In order to obtain such effects, it is preferable that the lower limit of each content of B, Ga, Mg, and Ca be set to 0.0002% or more, and the lower limit of Sn be set to 0.005% or more. On the other hand, excessive incorporation of these elements not only increases the refining cost of steel, but also deteriorates manufacturability and corrosion resistance of steel. Accordingly, the upper limit of the content of Ca is set to 0.0100% or less, the upper limit of the content of Sn is set to 0.20% or less, and the upper limit of each content of B, Ga, and Mg is set to 0.0200% or less.

Furthermore, the component composition of the present embodiment satisfies Expression (1).

$$10(B+Ga)+Sn+Mg+Ca>0.020 \qquad \text{Expression (1)}$$

Each of the element symbols in Expression (1) indicates the content (mass %) of each of the elements in the steel.

From the viewpoint of improving high-temperature strength and oxidation resistance, Expression (1) is preferably 0.025% or more, and is more preferably 0.035% or more. The upper limit of Expression (1) is not particularly limited by the upper limits of B, Sn, Ga, Mg, and Ca, but is preferably 0.2% from the viewpoint of high-temperature strength and manufacturability.

The ferritic stainless steel according to the present embodiment is composed of Fe and impurities in addition to the above-mentioned elements (the balance), but it can also contain any element to be described later. Accordingly, the lower limit of the content of each of Ni, Cu, Mo, Sb, W, Co, V, Ti, Zr, La, Y, Hf, and REM is 0% or more.

The term "impurities" in the present embodiment refers to components, which are mixed due to various factors in a manufacturing step, including raw materials such as ores and scraps in industrial manufacture of steel, and include inevitably mixed components.

If necessary, the ferritic stainless steel of the present embodiment may contain one or more of Ni: 1.0% or less, Cu: 1.0% or less, Mo: 1.0% or less, Sb: 0.5% or less, W: 1.0% or less, Co: 0.5% or less, V: 0.5% or less, Ti: 0.5% or less, Zr: 0.5% or less, La: 0.1% or less, Y: 0.1% or less, Hf: 0.1% or less, and REM: 0.1% or less.

Ni, Cu, Mo, Sb, W, Co, V, and Ti are elements effective for enhancing the high-temperature strength and corrosion resistance of steel, and they may be contained if necessary. However, if they are excessively incorporated, they lead to an increase in alloy cost and impair manufacturability, and therefore the upper limits of Ni, Cu, and W are set to 1.0% or less. Since Mo is an element that is also effective in inhibiting high-temperature deformation due to a decrease in a thermal expansion coefficient, it is preferably contained at the upper limit of 1.0% or less. Sb is an element that concentrates in the vicinity of a steel surface, promotes selective oxidation of Al, and thereby has the effect of improving corrosion resistance, and therefore is preferably contained at the upper limit of 0.5% or less. The upper limit of Co, Ti, and V is 0.5% or less. The lower limit of the preferable content of any element of Ni, Cu, Mo, W, Co, and V is 0.10% or more. The lower limit of the preferable content of Sb and Ti is 0.01% or more.

Zr, La, Hf, and REM are conventionally effective elements for improving hot workability and cleanliness of steel, and improving oxidation resistance, and may be added as necessary. However, from the technical idea of the present invention and the reduction of alloy cost, it is not possible to rely on the effect of adding these elements. When the elements are added, the upper limit of Zr is 0.5% and the upper limit of each of La, Y, Hf, and REM is 0.1%. The more preferable lower limit of Zr is 0.01%, and the preferable lower limit of each of La, Y, Hf, and REM is 0.001%. REM is an element belonging to atomic numbers 58 to 71 excluding La and Y, and Sc (scandium), and is, for example, Ce, Pr, Nd, or the like. In addition, REM in the present embodiment is composed of one or more elements selected from elements belonging to atomic numbers 58 to 71 and Sc, and an amount of REM is a total amount of these elements.

The ferritic stainless steel according to the present embodiment is composed of Fe and impurities (including unavoidable impurities) in addition to the above-described elements, but can contain other elements in addition to the above-described elements as long as the effects of the present invention are not impaired. In addition to the above-mentioned P and S, which are general impurity elements, it is preferable to reduce Bi, Se, and the like as much as possible. Meanwhile, the content ratio of these elements is controlled within the limit of solving the problem of the present invention, and if necessary, one or more of Bi≤100 ppm and Se≤100 ppm may be contained.

A metallographic structure of the ferritic stainless steel sheet of the present embodiment is a ferrite single-phase structure.

This means that the steel sheet does not have an austenite phase or a martensite structure. When an austenite phase or a martensite structure is included, a metallographic structure is set to a ferrite single-phase structure, because a raw material cost becomes high, and a decrease in yield due to edge cracking occurs during manufacturing. Although precipitates such as carbonitrides exist in the steel, these precipitates are not taken into account because they do not significantly affect the effects of the present invention, and the above description is regarding a structure of a primary phase.

<Maximum Concentrations of Cr, Al, Si in Steel Sheet Surface Layer Part>

In the ferritic stainless steel sheet of one embodiment according to the third aspect, Cr, Al, and Si are preliminarily concentrated on the steel sheet surface layer part in order to promote generation of an Al-based oxide film and enhance oxidation resistance. Specifically, each of maximum values (maximum concentrations) $Cr_m$, $Al_m$, and $Si_m$ in distribution of concentrations (cation fraction) of Cr, Al, and Si in the steel sheet surface layer part, which is a region from the steel sheet surface to the depth of 30 nm (region including the passivation film and immediately beneath the passivation film) satisfy Expression (2) and Expression (3).

$$15.0 < Cr_m (\text{mass \%}) < 55.0 \quad (2)$$

$$3.0 < Al_m + Si_m (\text{mass \%}) < 30.0 \quad (3)$$

The oxidation properties under the reformed gas environment is greatly affected by the passivation film formed on the ferritic stainless steel sheet. In general, after acid washing and polishing, a passivation film of about 2 nm to 20 nm is formed on the steel sheet surface. The oxidation of Cr is likely to be promoted when this passivation film mainly composed of Fe—Cr is formed on the surface. Therefore, in the present embodiment, Cr, Al, and Si are preliminarily concentrated in order to promote generation of an Al-based oxide film that effectively acts to improve oxidation resistance in the passivation film and in the region immediately beneath the passivation film. The reason why a target region for concentrating Cr, Al, and Si is limited to the region from the steel sheet surface to a depth of 30 nm is that, when the depth of 30 nm is adopted, it is possible to determine that a region of a thickness of 2 to 20 nm of a general passivation film+a position immediately beneath the film is sufficiently captured.

Regarding the composition of the region of the steel sheet surface to the depth of 30 nm, in order to promote the formation of the $Al_2O_3$ film, the maximum value $Cr_m$ of a Cr concentration is within a range of more than 15.0% by weight and less than 55.0 wt %, and the maximum value $(Al_m + Si_m)$ of the sum of a Al concentration and a Si concentration is within a range of more than 3.0 mass % and less than 30.0 mass %.

When $Cr_m$ is 15% or less, a Fe concentration in the region may increase and hinder the formation of an Al-based oxide film. Therefore, $Cr_m$ is set to more than 15.0%, preferably 20.0% or more. On the other hand, when $Cr_m$ is 55.0% or more, the formation of an Al-based oxide film may be hindered by the selective oxidation of Cr, and therefore $Cr_m$ is set to less than 55.0%, preferably 50.0% or less.

Furthermore, when Si is concentrated with Al, this inhibits the oxidation of Fe and Cr, which effectively acts on the formation of an Al-based oxide film. However, when $Al_m + Si_m$ is 3.0% or less, the oxidation of Fe and Cr may proceed to hinder the formation of an Al-based oxide film, and therefore $Al_m + Si_m$ is set to more than 3.0%, preferably 5.0% or more. On the other hand, although it is effective to increase concentrations of Al and Si to promote the formation of the Al-based oxide film, when $Al_m + Si_m$ is 30.0% or more, the oxidation resistance in the reformed gas environment is saturated, and furthermore, productivity may deteriorate. Accordingly, the upper limit of $Al_F + Si_F$ is less than 30.0%, preferably 25.0% or less, from the viewpoint of cost reduction.

The maximum concentrations of Cr, Al, and $Si_m$ (Crm, Alm, Sim) in the region (surface layer part) from the steel sheet surface to a depth of 30 nm can be obtained by glow discharge optical emission spectrometry (GDS analysis method). It is possible to detect light elements such as O, C, and N at the same time, and it is possible to measure the concentration profile of each element in the depth direction from the steel sheet surface. Details of the detection will be described later. In the present embodiment, the concentration of Cr in the surface layer part obtained by GDS analysis is represented by the concentration of Cr with respect to the total amount of Fe, Cr, Mn, Si, Al, Ti, Nb, C, N, and O excluding C, N, and O. The same applies to the concentrations of Al and Si. Then, in the surface layer part, the concentrations that maximize the Cr, Al, and Si concentrations are Crm, Alm, and Sim. Specifically, each element profile of Fe, Cr, Mn, Si, Al, Ti, Nb, C, N, and O, excluding C, N, and O, is created, and then Crm, Alm, and Sim can be obtained by adopting values at the positions where the Cr, Al, and Si concentrations are the maximum values within a region from the steel sheet surface to a depth of 30 nm.

Although Fe, Cr, Mn, Si, Al, Ti, and Nb are the elements detected in the GDS analysis, since they are elements concentrating on the steel sheet surface and are elements forming oxides, they are used for calculating Crm, Alm, and Sim.

Since N does not concentrate on the surface and C and O are contaminating elements, the concentrations of Cr, Al, and Si are calculated excluding these three elements after detection by GDS analysis.

<Texture>

The ferritic stainless steel sheet according to one embodiment of the third aspect satisfies the following (A) and (B) with respect to the recrystallization texture in order to enhance high-temperature strength.

(A) In the plate thickness middle portion, an area ratio of {111}±10° oriented grains, in which an angle difference between a normal direction of a steel sheet surface and a {111} plane orientation is within 10°, is more than 20.0% and less than 60.0%.

(B) In the plate thickness middle portion, an area ratio of {110}±10° oriented grains, in which an angle difference between a normal direction of a steel sheet surface and a {110} plane orientation is within 10°, is more than 0.5% and less than 5.0%.

The {111}±10° oriented grains are the main texture among recrystallization textures, but it has been found that it is effective to secure a predetermined amount of {110}±10° oriented grains that are the structure in which the grain size is smaller than that of the {111}±10° oriented grains, in order to increase the high-temperature strength, particularly a 0.2% proof stress. That is, it is presumed that, in the plate thickness middle portion, by including an area ratio of {110}±10° oriented grains to more than 0.5% and less than 5%, slip of the crystal grain boundaries of {111}±10° oriented grains is delayed, which contributes to the increase of the dislocation density near the crystal grain boundaries, and as a result, the 0.2% proof stress can be improved.

The area ratio of {110}±10° oriented grains is more than 0.5%, and is preferably 0.7% or more, from the viewpoint of enhancing high-temperature strength. In order to promote the generation of {110}±10° oriented grains, it is effective to increase a rolling reduction rate during cold rolling, but when the generation of {110}±10° oriented grains is promoted excessively, there is a possibility that the rolling reduction rate increases and manufacturability deteriorates. Furthermore, even when an area ratio of {110}±10° oriented grains is excessively increased, the effect of improving high-temperature strength is saturated. Based on the above, the upper limit of the area ratio of {110}±10° oriented grains is set to less than 5.0%, preferably 4.0% or less, and more preferably 2.0% or less.

The area ratio of {111}±10° oriented grains has the lower limit of more than 20.0% to prevent deterioration of workability, and the upper limit of less than 60.0% to prevent deterioration of manufacturability. From the viewpoint of achieving both workability and manufacturability, a preferable range is 30.0% to 55.0%, and a more preferable range is 35.0% to 50.0%.

The term "{111}±10° oriented grain" represents a crystal grain having a crystal orientation in which an angle difference between a normal direction of the steel sheet surface in the plate thickness middle portion and the {111} plane orientation is within 10° (where an allowable angle range is 0° to 10°). The term "{110}±10° oriented grain" represents a crystal grain having a crystal orientation in which an angle difference between a normal direction of the steel sheet surface in the plate thickness middle portion and the {110} plane orientation is within 10° (where an allowable angle range is 0° to 10°).

Furthermore, the term "plate thickness middle portion" is a region including the center of the plate thickness t of the steel sheet, that is, the position of (½)t, and preferably refers to a region from the center of the plate thickness t of the steel sheet up to a plate thickness of ⅛ t toward both surfaces of the steel sheet.

The area ratio of {111}±10° oriented grains and {110}±10° oriented grains can be analyzed using an electron beam backscattering diffraction method (hereinafter, EBSD method). The EBSD method is to measure and analyze crystal orientation of each crystal grain in a micro-region on a sample surface at high speed.

For example, in a plane (L cross-section) parallel to the steel sheet surface at the plate thickness middle portion, using a scanning electron microscope and an EBSD detector, EBSD is measured at a measurement region of a plate width direction of 850 μm and a rolling direction of 2.250 μm with a magnification of 100. Next, using EBSD analysis software OIM-Analysis (manufactured by TSL), and the EBSD measurement data, an area ratio can be calculated by displaying a crystal orientation map of crystal grains in which an angle difference between the normal direction of the plane parallel to the steel sheet surface and the {111} plane orientation is within 10° (that is, {111}±10° oriented grains). The area ratio of {110}±10° oriented grains can be obtained by the same method.

<Presence State of Al and Si in Passivation Film (Valence of Oxide)>

Furthermore, in the ferritic stainless steel sheet of one embodiment according to the third aspect, in order to promote generation of an Al-based oxide film ($Al_2O_3$ film) and increase oxidation resistance, it is preferable to control the presence state (valence of oxide) of Al and Si in the passivation film. The "valence of oxide" can be obtained by a binding energy difference between an oxide peak and a metal peak (eV, hereinafter referred to as ΔE).

In the present embodiment, in a case of measuring the steel sheet surface by hard X-ray photoelectron spectroscopy using hard X-rays, a binding energy difference $\Delta E_{Al}$ (eV) between an oxide peak of the passivation film and a metal peak of a base material in the passivation film is preferably $1.5<\Delta E_{Al}<3.0$ in a photoelectron spectrum for Al 1 s orbit. Similarly, a binding energy difference $\Delta E_{Si}$ (eV) between an oxide peak of the passivation film and a metal peak of a base material in the passivation film is preferably $1.0<\Delta E_{Si}<4.0$ in a photoelectron spectrum for Si 1 s orbit.

When $\Delta E_{Al}$ of Al is orbit is more than 1.5 eV and less than 3.0 eV, Al in the passivation film is in a state of being present as stable trivalent $Al_2O_3$, and formation of $Al_2O_3$ which is effective for oxidation resistance under the reformed gas environment is further promoted. However, when $\Delta E_{Al}$ is 1.5 eV or less or 3.0 eV or more, it means that Al is present as a divalent or tetravalent oxide or a complex oxide, and cannot be present as stable $Al_2O_3$, which is not preferable. Based on the above, $\Delta E_{Al}$ of Al 1 s orbit is more preferably 1.7 to 2.8 eV, and even more preferably 1.9 to 2.6 eV. A half-value width of an oxide peak of the Al 1 s orbit is less than 2.5 eV, and it may be wider than a half-value width of pure $Al_2O_3$ as a standard substance. A half-value width of the oxide peak of the Al 1 s orbit is preferably less than 2.3 eV and more preferably less than 2.0 eV.

When $\Delta E_{Si}$ of Si 1 s orbit is more than 1.0 eV and less than 4.0 eV, Si in the passivation film has a chemical bond state in which 1 to 3 valences are mixed, and is present in a state in which a valence is lower than that of stable tetravalent $SiO_2$. Since Si forms a low valence oxide, Si selectively oxidizes under a reformed gas environment to inhibit the oxidation of Fe and Cr. Therefore, the formation of an $Al_2O_3$ film immediately beneath the Si oxide can be promoted. However, when $\Delta E_{Si}$ is 1.0 eV or less or 4.0 eV or more, Si may be stable in the state of a double oxide, which is not preferable. Based on the above, $\Delta E_{Si}$ of the Si 1 s orbit is more preferably 1.5 to 3.8 eV, and even more preferably 1.8 to 3.5 eV. A half-value width of an oxide peak of the Si is orbit is less than 2.5 eV, and it may be wider than a half-value width of pure $SiO_2$ as a standard substance. When the half-value width is more than the above range, a presence ratio effective for improving oxidation resistance becomes small Based on the above, a half-value width of the oxide peak of the Si 1 s orbit is preferably less than 2.3 eV and more preferably less than 2.0 eV.

The presence states of Al and Si can be analyzed with high sensitivity by a hard X-ray photoelectron spectroscopy (HAXPES method) using hard X-rays. When using such high-energy X-rays, it is effective to analyze electron orbits of the core level that are not interfered with by O, Fe, Cr, and the like.

Furthermore, in the photoelectron spectra for the Al 1 s orbit and the Si 1 s orbit, which are core levels, kinetic energy of photoelectrons is increased by the high-energy X-rays, and a deep detection depth can be obtained. Since the passivation film in the present embodiment is about several nm, a detection depth can reach the base material, and therefore the oxide peak and the metal peak of the photoelectron spectra for the Al 1 s orbit and Si 1 s orbit can be obtained at the same time. A binding energy difference $\Delta E$ (eV) and the half-value width of the oxide peak can be obtained by peak fitting (fitting function; Gaussian function, Lorentz function) using data analysis software ("Multi Pack" manufactured by ULVAC-PHI, Inc.). In the photoelectron spectra for the Al 1 s orbit and the Si 1 s orbit in the HAXPES method, both the oxide peak and the metal peak can be detected in the following binding energy region.

Al 1 s orbit: 1555.0 to 1565.0 eV
Si 1 s orbit: 1835.0 to 1850.0 eV

The measurement of the hard X-ray photoelectron spectroscopy (HAXPES method) in the present embodiment can be performed using a hard X-ray photoelectron spectrometer ("R-4000" manufactured by Scienta Omicron) under the following conditions.

Excited X-ray energy: 7939 eV
Photoelectron extraction angle (TOA): 80°
Analyzer slit: curved 0.5 mm
Analyzer pass energy: 200 eV <Manufacturing Method>

Next, regarding a method for manufacturing the ferritic stainless steel sheet according to the embodiment of the third aspect described above, the ferritic stainless steel sheet can be manufactured by combining hot working, cold working, and each heat treatment (annealing), and if necessary, descaling by polishing or acid immersion may be appropriately performed. As an example of the manufacturing method, it is possible to adopt a manufacturing method including the steps of steelmaking-hot rolling-annealing-cold rolling-annealing (final annealing)-mechanical polishing-acid immersion, and a heat treatment after the hot rolling may not be performed, or it may be performed at 700° C. or lower. For example, the heat treatment after the hot rolling may not be performed, and cold rolling may be performed after descaling, and then final annealing and descaling may be performed to obtain a cold rolled annealed plate. In addition, a rolling reduction rate of cold rolling is within a range of 30% to 80%.

Furthermore, in order to control the Cr concentration, Al concentration, and Si concentration of the steel sheet surface layer part within the above range, mechanical polishing performed after final annealing and an acid immersion step are important. Specifically, after final annealing, polishing is performed with a polishing material of #100 or less, and then the acid immersion step including at least one of the following treatment (A) and treatment (B) is performed.

Treatment (A): Immersion in a sulfuric acid aqueous solution at 90° C. or lower containing 10 to 50 mass % of $H_2SO_4$.

Treatment (B): Immersion in a nitric-hydrofluoric acid aqueous solution at 90° C. or lower containing 1 mass % or more of $HNO_3$ and 0.5 mass % or more of HF.

Furthermore, when a ferritic stainless steel sheet is applied to gas pipe applications, it includes welded pipes manufactured from steel sheets, but the pipes are not limited to the welded pipes, and seamless pipes manufactured by hot working may be used.

When the heat treatment after hot rolling (hot-band annealing) is performed at a temperature higher than 700° C., {111}±10° oriented grains are excessively generated, while {110}±10° oriented grains are not sufficiently secured in some cases. In particular, {110}±10° oriented grains are likely to be recrystallized from crystal grain boundaries having high strain energy. Therefore, in order to secure a predetermined amount of {110}±10° oriented grains, the heat treatment after hot rolling is omitted, or cold rolling is performed after the heat treatment is performed at 700° C. or lower, at which strain energy during hot rolling is not eliminated.

Furthermore, when the cold rolling reduction rate is less than 30%, the generation of {110}±10° oriented grains does not proceed. Therefore, in some cases, it is difficult to secure a sufficient amount thereof, and abnormal grain growth occurs after final annealing and thereby the crystal grains become coarse. Furthermore, when the cold rolling reduction rate is more than 80%, the generation of {110}±10° oriented grains can be promoted, but it may impair workability of steel. Considering the productivity of cold rolling and material characteristics, the cold rolling reduction rate is more preferably in a range of 40% to 75%.

In addition, the temperature of final annealing after cold rolling is not particularly specified, but is preferably in a range of 850° C. to 1,000° C.

In the present embodiment, the atmosphere for the hot-band annealing and final annealing is not particularly specified, but is preferably atmospheric air, an LNG fuel atmosphere, a non-oxidizing atmosphere formed of hydrogen, nitrogen, argon, or the like (bright annealing).

By performing mechanical polishing after final annealing, dislocations are introduced into the steel sheet surface, and diffusion of atoms is promoted. As a result, not only the concentration of Cr but also the concentrations of Al and Si can be increased in the passivation film formed in the subsequent atmospheric air standing or acid immersion step. It is preferable that mechanical polishing be performed after cold rolling and final annealing, and then the acid immersion step be performed.

The mechanical polishing uses a polishing material having the number of 100 or less, and a coil grinder is used for one pass, for example. From the viewpoint of further introducing dislocations and increasing the concentrations of Cr, Al, and Si in the passivation film, the number of a polishing material is preferably #80 or less, and more preferably #30 or less.

In the acid immersion step after the mechanical polishing, at least one of the above treatment (A) and treatment (B) is performed. That is, after the mechanical polishing, any one of the treatment (A) or the treatment (B) may be performed, or both may be performed. The order of performing both the treatment (A) and the treatment (B) is not limited, and for example, the treatment (B) may be performed after the treatment (A). A temperature of a sulfuric acid aqueous solution and a nitric-hydrofluoric acid aqueous solution may be 40° C. to 90° C. Furthermore, the concentration of $HNO_3$ in the nitric-hydrofluoric acid aqueous solution may be 1 to 20 mass %, and the concentration of HF may be 0.5 to 10 mass %.

When the above treatments (A) and (B) are simply performed without mechanical polishing, acid immersion will be performed without the above-mentioned effect of promoting diffusion of atoms being exhibited, and therefore concentration of Cr, Al, and Si in the passivation film cannot be achieved.

The ferritic stainless steel or the ferritic stainless steel sheet of each of the embodiments according to the first aspect to the third aspect can be obtained by the manufacturing method of the first aspect to the third aspect described above.

According to each of the embodiments of the first to third aspects, it is possible to provide ferritic stainless steel or a ferritic stainless steel sheet having both high oxidation resistance and excellent high-temperature strength, even under environments containing carbon dioxide, carbon monoxide, a large amount of hydrogen, and a sulfidized component (carburizing/reducing/sulfidizing environments).

In the embodiment according to the second aspect, it is possible to impart further excellent high-temperature strength by appropriately controlling the recrystallization texture.

In the embodiment according to the third aspect, particularly, it is possible to impart further excellent high-temperature strength by appropriately controlling the recrystallization texture, and it is possible to impart further excellent oxidation resistance in the passivation film and in the steel sheet surface layer part immediately beneath the passivation film by controlling the respective concentrations of Cr, Al, and Si.

Furthermore, according to each of the embodiments of the first to third aspects, by optimizing the component composition, it is possible to impart excellent structural stability that can inhibit σ-phase precipitation and 475° C. brittleness.

For this reason, the ferritic stainless steel or the ferritic stainless steel sheet can be suitable for a fuel reformer used when reforming hydrocarbon fuels such as city gas, methane, natural gas, propane, kerosene, and gasoline to hydrogen, and for fuel cell members such as heat exchangers. In particular, they are suitable for a high-temperature member of a solid oxide fuel cell (SOFC) or a polymer electrolyte fuel cell (PEFC) which has a high operating temperature. Furthermore, they can be suitably used for peripheral members of fuel cells, for example, burners, combustors storing the burners, and the like, and can be suitably used for all members that come in contact with a reformed gas and used under a high-temperature environment.

EXAMPLES

Hereinafter, examples of the present invention will be described, but the conditions in the examples are examples of one condition adopted to confirm the practicability and effects of the present invention, and the present invention is not limited to the conditions used in the following examples. The present invention can adopt various conditions as long as the object of the present invention is achieved without departing from the gist of the present invention.

Underlines shown in the following tables show that the corresponding values deviate from the range of the present invention.

[First Aspect]

Various ferritic stainless steel having components shown in Table 1 were melted (Steel 1-A to 1-O), formed into hot-rolled plates with a thickness of 4 mm by hot rolling, subjected to a heat treatment (hot-band annealing) and acid washing, and subjected to cold rolling, and thereby cold-rolled steel sheets each having a plate thickness of 0.8 mm were obtained. The hot-band annealing was performed in the range of 900° C. to 1,000° C.

After the cold rolling, final annealing was performed at 900° C. to 1,000° C. Some of the steel sheets (Steel 1-B, 1-E, 1-F, and 1-I) were subjected to a heat treatment under conditions shown in Table 2 (heat treatment after final annealing) after final annealing.

The obtained cold-rolled steel sheets (Nos. 1-1 to 1-19) were evaluated for measurement of grain boundary concentration and various characteristics.

[Measurement of Grain Boundary Concentration]

A Nb concentration and a Sn concentration in a crystal grain system were measured by Auger electron spectroscopy.

First, a notched test piece (0.8 t×4 w×20 L (mm)) was taken from the cold-rolled steel sheet. Next, the notched test piece was cooled with liquid nitrogen in a vacuum (vacuum degree: $10^{-6}$ MPa), and then the notch part was fractured in situ to expose the crystal grain boundaries such that the fracture surface was not exposed to atmospheric air. AES analysis was performed on the exposed crystal grain boundaries, Auger electron spectra were measured in the energy range of 0 to 1,000 eV, and a Nb element and a Sn element were identified (qualitative analysis). Furthermore, using the obtained peak intensity ratio (relative sensitivity coefficient method), the Nb amount and Sn amount were quantitatively analyzed, and the Nb concentration and Sn concentration segregated at the crystal grain boundaries (both in mass %) were obtained. Table 2 shows the obtained Nb concentration and Sn concentration. In the table, "<3.0" and "<1.0" mean that detection values were less than 3.0% and less than 1.0%.

[Oxidation Resistance]

First, an oxidized test piece having a width of 20 mm and a length of 25 mm was cut out from the cold-rolled steel sheet and subjected to an oxidation test. The atmosphere for the oxidation test was 28 vol % of $H_2O$—10% vol % of CO—8 vol % of $CO_2$—0.01% of $H_2S$-bal·$H_2$ in which it was assumed to be a reformed gas having city gas as a fuel. In the atmosphere, the oxidized test piece was heated to 650° C., retained for 1,000 hours, and then cooled to room temperature, and an oxidation increase $\Delta W$ (mg/cm$^2$) was measured.

The evaluation of oxidation resistance was as follows.

A: A weight increase $\Delta W$ was less than 0.2 mg/cm$^2$.
B: A weight increase $\Delta W$ was 0.2 to 0.3 mg/cm$^2$.
C: A weight increase $\Delta W$ was more than 0.3 mg/cm$^2$.

The oxidation resistance was considered acceptable when the evaluation was "A" or "B."

[High-Temperature Strength]

A plate-shaped high-temperature tensile test piece (plate thickness: 0.8 mm, parallel part width: 10.5 mm, parallel part length: 35 mm) having a longitudinal direction in a rolling direction was produced from the cold-rolled steel sheet. A high-temperature tensile test was performed at each temperature of 750° C. and 800° C. with a strain rate of 0.3%/min up to 0.2% proof stress, and then 3 mm/min for proof stress of more than 0.2% proof stress, and a 0.2% proof stress at each of the temperatures (750° C. proof stress, 800° C. proof stress) was measured (according to JIS G 0567).

The evaluation of high-temperature strength was performed, and when a 750° C. proof stress was more than 120 MPa and an 800° C. proof stress was more than 40 MPa, the high-temperature strength was evaluated as being acceptable ("B"), and when any one thereof was not satisfied, it was evaluated as being not acceptable ("C"). When a 750° C. proof stress was more than 150 MPa and an 800° C. proof stress was more than 60 MPa, the high-temperature strength was evaluated as being particularly excellent (indicated as "A" in Table 2).

[Structural Stability (σ Brittleness/475° C. Brittleness)]

Two samples were taken from the cold-rolled steel sheet such that the center of the cross-section perpendicular to the plate surface (plate thickness middle portion: around t/2) could be observed, one of which was subjected to a heat treatment at 500° C.×1,000 hours (500° C. heat treatment), and the other was subjected to a heat treatment at 650° C.×1,000 hours (600° C. heat treatment). The atmosphere for these heat treatments was atmospheric air. Next, after each of the heat-treated samples was embedded in resin and polished, the Vickers hardness $Hv_{500°\ C.}$ after the heat treatment at 500° C. and the Vickers hardness $Hv_{650°\ C.}$ after the heat treatment at 650° C. were each measured under a load of 9.8 N in accordance with JIS Z 2244, and the hardness increase amounts $\Delta Hv_{500°\ C.}$ and $\Delta Hv_{650°\ C.}$ were calculated from the Vickers hardness before the heat treatment which was preliminarily measured before the heat treatment.

Regarding the evaluation of the structural stability (σ brittleness/475° C. brittleness), a case in which each of $\Delta Hv_{500°\ C.}$ and $\Delta Hv_{650°\ C.}$ was less than 20 was evaluated as being acceptable ("A"), and a case in which any one thereof was 20 or more was evaluated as being not acceptable because the structure in which hardness was significantly increased after the heat treatment was unstable.

Table 2 shows the obtained evaluation results (measurement of grain boundary concentration and various characteristics).

Nos. 1-1 to 1-13 satisfied the components specified in the present invention, and all the characteristics were evaluated as "B" or "A." Among them, Nos. 1-3, 1-7, 1-9, and 1-13 were cases in which the suitable grain boundary concentration of the present invention was satisfied. They exhibited a remarkable effect of improving high-temperature strength, and therefore the evaluation thereof was "A." In addition, Nos. 1-2, 1-3, 1-8, 1-9, and 1-11 were cases in which a suitable component composition (particularly, Cr, Si, Al) of the present invention was satisfied. They exhibited a remarkable effect of improving oxidation resistance, and therefore the evaluation thereof was "A."

Steel Nos. 1-14 to 1-19 were out of the steel composition specified in the present invention. They did not satisfy each of the characteristics targeted by the present invention, and the evaluation of each steel was "C."

TABLE 1

Component (mass %): balance consisting of Fe and impurities

| Steel | C | Si | Mn | P | S | Cr | Nb | Al | N | B | Ga | Sn | Mg | Ca | Expression (1) | Other elements |
|---|---|---|---|---|---|---|---|---|---|---|---|---|---|---|---|---|
| 1-A | 0.018 | 0.40 | 0.15 | 0.030 | 0.0027 | 15.8 | 0.65 | 1.10 | 0.026 | 0.0025 | 0.000 | 0.00 | 0.000 | 0.000 | 0.025 | |
| 1-B | 0.008 | 0.85 | 0.25 | 0.019 | 0.0003 | 14.2 | 0.31 | 1.90 | 0.011 | 0.0008 | 0.000 | 0.03 | 0.000 | 0.000 | 0.038 | |
| 1-C | 0.011 | 2.30 | 0.30 | 0.025 | 0.0008 | 12.2 | 0.25 | 0.90 | 0.010 | 0.0002 | 0.010 | 0.00 | 0.005 | 0.003 | 0.110 | |
| 1-D | 0.003 | 0.55 | 0.21 | 0.019 | 0.0006 | 12.9 | 0.09 | 2.40 | 0.005 | 0.0025 | 0.000 | 0.01 | 0.005 | 0.000 | 0.040 | Ni: 0.35, Cu: 0.40 |
| 1-E | 0.006 | 1.10 | 0.30 | 0.035 | 0.0003 | 13.5 | 0.50 | 1.40 | 0.010 | 0.0004 | 0.001 | 0.00 | 0.001 | 0.008 | 0.023 | Ti: 0.09, Mo: 0.20, V: 0.23 |
| 1-F | 0.005 | 0.90 | 0.80 | 0.027 | 0.0019 | 13.4 | 0.38 | 1.50 | 0.012 | 0.0055 | 0.003 | 0.01 | 0.000 | 0.000 | 0.095 | Sb: 0.01, W: 0.20, Co: 0.30 |
| 1-G | 0.015 | 0.55 | 0.35 | 0.025 | 0.0002 | 14.2 | 0.36 | 1.60 | 0.015 | 0.0003 | 0.003 | 0.16 | 0.003 | 0.003 | 0.199 | |
| 1-H | 0.013 | 0.75 | 0.25 | 0.012 | 0.0005 | 14.8 | 0.21 | 2.10 | 0.015 | 0.0003 | 0.016 | 0.02 | 0.000 | 0.000 | 0.183 | REM: 0.02 |
| 1-I | 0.008 | 0.51 | 0.55 | 0.028 | 0.0007 | 12.2 | 0.28 | 1.10 | 0.013 | 0.0011 | 0.002 | 0.00 | 0.018 | 0.004 | 0.053 | Zr: 0.02, La: 0.01, Y: 0.01, Hf: 0.02 |
| 1-J | 0.004 | 0.55 | 0.14 | 0.022 | 0.0007 | <u>11.6</u> | 0.25 | 1.10 | 0.010 | 0.0012 | 0.003 | 0.01 | 0.002 | 0.004 | 0.058 | |
| 1-K | 0.015 | 0.51 | <u>1.10</u> | 0.020 | 0.0007 | 13.3 | 0.25 | 1.20 | 0.016 | 0.0009 | 0.003 | 0.01 | 0.002 | 0.000 | 0.051 | |
| 1-L | 0.011 | 0.52 | 0.20 | 0.020 | <u>0.0035</u> | 13.2 | 0.26 | 1.10 | 0.015 | 0.0000 | 0.002 | 0.01 | 0.000 | 0.004 | 0.034 | |
| 1-M | <u>0.023</u> | 0.53 | 0.35 | 0.030 | 0.0007 | 13.2 | 0.26 | 1.10 | <u>0.031</u> | 0.0008 | 0.002 | 0.01 | 0.003 | 0.000 | 0.041 | |
| 1-N | 0.005 | 0.54 | 0.35 | 0.030 | 0.0007 | <u>16.3</u> | 0.25 | 1.10 | 0.025 | 0.0007 | 0.003 | 0.01 | 0.000 | 0.003 | 0.050 | |
| 1-O | 0.012 | 0.53 | 0.32 | 0.021 | 0.0005 | 13.5 | 0.26 | 1.30 | 0.013 | 0.0003 | 0.000 | 0.01 | 0.003 | 0.003 | <u>0.019</u> | |

(Annotation 1) Expression (1): 10(B + Ga) + Sn + Mg + Ca (Annotation 2) Underlines indicate values deviated from those of the present invention

TABLE 2

| No. | Steel | Heat treatment after final annealing — Whether treatment was performed | Temperature (° C.) | Time (min) | Grain boundary concentration Nb/% | Sn/% | Oxidation resistance | High-temperature strength | Structural stability | Remarks |
|---|---|---|---|---|---|---|---|---|---|---|
| 1-1 | 1-A | Not performed | — | — | <3.0 | — | B | B | A | Present Example |
| 1-2 | 1-B | Not performed | — | — | <3.0 | <1.0 | A | B | A | Present Example |
| 1-3 | | Performed | 650 | 3 | 6.5 | 1.5 | A | A | A | Present Example |
| 1-4 | 1-C | Not performed | — | — | <3.0 | — | B | B | A | Present Example |
| 1-5 | 1-D | Not performed | — | — | <3.0 | <1.0 | B | B | A | Present Example |
| 1-6 | 1-E | Not performed | — | — | <3.0 | — | B | B | A | Present Example |
| 1-7 | | Performed | 700 | 5 | 8.7 | — | B | A | A | Present Example |
| 1-8 | 1-F | Not performed | — | — | <3.0 | <1.0 | A | B | A | Present Example |
| 1-9 | | Performed | 600 | 60 | 7.8 | 1.1 | A | A | A | Present Example |
| 1-10 | 1-G | Not performed | — | — | <3.0 | <1.0 | B | B | A | Present Example |
| 1-11 | 1-H | Not performed | — | — | <3.0 | <1.0 | A | B | A | Present Example |
| 1-12 | 1-I | Not performed | — | — | <3.0 | — | B | B | A | Present Example |
| 1-13 | | Performed | 650 | 120 | 7.5 | — | B | A | A | Present Example |
| 1-14 | 1-J | Not performed | — | — | <3.0 | <1.0 | C | B | A | Comparative Example |
| 1-15 | 1-K | Not performed | — | — | <3.0 | <1.0 | C | B | A | Comparative Example |
| 1-16 | 1-L | Not performed | — | — | <3.0 | <1.0 | C | C | A | Comparative Example |
| 1-17 | 1-M | Not performed | — | — | <3.0 | <1.0 | C | B | A | Comparative Example |
| 1-18 | 1-N | Not performed | — | — | <3.0 | <1.0 | C | B | C | Comparative Example |
| 1-19 | 1-O | Not performed | — | — | <3.0 | <1.0 | C | C | A | Comparative Example |

(Annotation) Underlines indicate steel deviated from those of the present invention

[Second Aspect]

Various ferritic stainless steel having components shown in Table 3 were melted (Steel 2-A to 2-O), formed into hot-rolled plates with a thickness of 2.5 to 4 mm by hot rolling, subjected to a heat treatment (hot-band annealing) and acid washing, and subjected to cold rolling, and thereby cold-rolled steel sheets each having a thickness of 1.0 mm were manufactured. The treatment temperature of hot-band annealing and the rolling reduction rate during cold rolling (cold rolling reduction rate) were as shown in Table 4.

After cold rolling, final annealing was performed at 900° C. to 1,000° C., and the obtained cold-rolled steel sheets (Nos. 2-1 to 2-18) were evaluated for texture and various characteristics.

[Texture]

The area ratio of each of {111}±10° oriented grains and {110}±10° oriented grains was analyzed using an electron beam backscattering diffraction method (hereinafter, EBSD method).

First, in a plane (L cross-section) parallel to the steel sheet surface at the plate thickness middle portion, using a scanning electron microscope and an EBSD detector, the measurement was performed at a measurement region of a plate width direction of 850 μm and a rolling direction of 2,250 μm with a magnification of 100. Next, using EBSD analysis software OIM-Analysis (manufactured by TSL), and the measurement data, an area ratio was calculated by displaying a crystal orientation map of crystal grains in which an angle difference between the normal direction of the plane parallel to the steel sheet surface and the {111} plane orientation was within 10° (that is, {111}±10° oriented grains). The area ratio of {110}±10° oriented grains was calculated by the same method.

In Table 4, an area ratio of {111}±10° oriented grains is expressed as "{111}%", and an area ratio of {110}±10° oriented grains is expressed as "{110}%."

[Oxidation Resistance]

First, an oxidized test piece having a width of 20 mm and a length of 25 mm was cut out from the cold-rolled steel sheet and subjected to an oxidation test. The atmosphere for the oxidation test was 28 vol % of $H_2O$—10% vol % of CO—8 vol % of $CO_2$—0.01% of $H_2S$-bal·$H_2$ in which it was assumed to be a reformed gas having city gas as a fuel. In the atmosphere, the oxidized test piece was heated to 650° C., retained for 1,000 hours, and then cooled to room temperature, and an oxidation increase ΔW (mg/cm$^2$) was measured.

The evaluation of oxidation resistance was as follows.
A: A weight increase ΔW was less than 0.2 mg/cm².
B: A weight increase ΔW was 0.2 to 0.3 mg/cm².
C: A weight increase ΔW was more than 0.3 mg/cm².
The oxidation resistance was considered acceptable when the evaluation was "A" or "B."

[High-Temperature Strength]

A plate-shaped high-temperature tensile test piece (plate thickness: 1.0 mm, parallel part width: 10.5 mm, parallel part length: 35 mm) having a longitudinal direction in a rolling direction was produced from the cold-rolled steel sheet. A high-temperature tensile test was performed at each temperature of 750° C. and 800° C. with a strain rate of 0.3%/min up to 0.2% proof stress, and then 3 mm/min for proof stress of more than 0.2% proof stress, and a 0.2% proof stress at each of the temperatures (750° C. proof stress, 800° C. proof stress) was measured (according to JIS G 0567).

The evaluation of high-temperature strength was performed, and when a 750° C. proof stress was more than 130 MPa and an 800° C. proof stress was more than 45 MPa, the high-temperature strength was evaluated as being acceptable ("B"), and when any one thereof was not satisfied, it was evaluated as being not acceptable ("C"). When a 750° C. proof stress was more than 150 MPa and an 800° C. proof stress was more than 60 MPa, the high-temperature strength was evaluated as being particularly excellent (indicated as "A" in Table 4).

[Structural Stability (σ Brittleness/475° C. Brittleness)]

Two samples were taken from the cold-rolled steel sheet such that the center of the cross-section perpendicular to the plate surface (plate thickness middle portion: around t/2) could be observed, one of which was subjected to a heat treatment at 500° C.×1,000 hours (500° C. heat treatment), and the other was subjected to a heat treatment at 650° C.×1,000 hours (650° C. heat treatment). The atmosphere for these heat treatments was atmospheric air. Next, after each of the heat-treated samples was embedded in resin and polished, the Vickers hardness $Hv_{500°\ C.}$ after the heat treatment at 500° C. and the Vickers hardness $Hv_{650°\ C.}$ after the heat treatment at 650° C. were each measured under a load of 9.8 N in accordance with JIS Z 2244, and the hardness increase amounts $\Delta Hv_{500°\ C.}$ and $\Delta Hv_{650°\ C.}$ were calculated from the Vickers hardness before the heat treatment which was preliminarily measured before the heat treatment.

Regarding the evaluation of the structural stability (σ brittleness/475° C. brittleness), a case in which each of $\Delta Hv_{500°\ C.}$ and $\Delta Hv_{650°\ C.}$ was less than 20 was evaluated as being acceptable ("A"), and a case in which any one thereof was 20 or more was evaluated as being not acceptable because the structure in which hardness was significantly increased after the heat treatment was unstable.

Table 4 shows the obtained evaluation results (texture observation, various characteristics).

Nos. 2-1 to 2-9 and 2-11 satisfied the components specified in the present invention, and all the characteristics were evaluated as "B" or "A." Among them, Nos. 2-2, 2-3, 2-7, 2-8, and 2-9 are cases in which a suitable component composition of the present invention was satisfied, and also the texture morphology was within the suitable range of the present invention. They exhibited a remarkable effect of improving high-temperature strength, and therefore the evaluation thereof was "A." In addition, Nos. 2-2, 2-3, 2-7, and 2-9 were cases in which a suitable component composition (particularly, Cr, Si, Al, and Expression (1)) of the present invention was satisfied. They exhibited a remarkable effect of improving oxidation resistance, and therefore the evaluation thereof was "A."

Nos. 2-10 and 2-12 were examples which were out of the manufacture conditions defined by the present invention and in which the texture morphology targeted by the present invention was not satisfied, and therefore the evaluation of high-temperature strength was "C." In addition, Steel Nos. 2-13 to 2-18 were out of the steel composition specified in the present invention. They did not satisfy each of the characteristics targeted by the present invention, and the evaluation of each steel was

TABLE 3

Component (mass %): balance consisting of Fe and impurities

| Steel | C | Si | Mn | P | S | Cr | Nb | Al | N | B | Ga | Sn | Mg | Ca | Expression (1) | Other elements |
|---|---|---|---|---|---|---|---|---|---|---|---|---|---|---|---|---|
| 2-A | 0.019 | 0.40 | 0.14 | 0.030 | 0.0028 | 15.9 | 0.71 | 1.10 | 0.027 | 0.0031 | 0.000 | 0.00 | 0.000 | 0.000 | 0.031 | |
| 2-B | 0.004 | 0.91 | 0.22 | 0.018 | 0.0002 | 13.9 | 0.36 | 2.10 | 0.015 | 0.0013 | 0.000 | 0.02 | 0.000 | 0.000 | 0.033 | |
| 2-C | 0.008 | 2.41 | 0.31 | 0.015 | 0.0005 | 12.1 | 0.51 | 0.90 | 0.011 | 0.0002 | 0.015 | 0.00 | 0.006 | 0.005 | 0.163 | |
| 2-D | 0.002 | 0.61 | 0.24 | 0.025 | 0.0003 | 13.1 | 0.08 | 2.45 | 0.004 | 0.0031 | 0.000 | 0.02 | 0.005 | 0.000 | 0.056 | Ni: 0.28, Mo: 0.35, V: 0.25 |
| 2-E | 0.005 | 1.20 | 0.30 | 0.041 | 0.0003 | 14.1 | 0.26 | 1.30 | 0.011 | 0.0002 | 0.001 | 0.00 | 0.001 | 0.009 | 0.022 | Ti: 0.21, Cu: 0.35 |
| 2-F | 0.005 | 0.90 | 0.80 | 0.014 | 0.0005 | 13.4 | 0.38 | 1.70 | 0.012 | 0.0060 | 0.003 | 0.01 | 0.000 | 0.000 | 0.100 | Sb: 0.02, W: 0.3, Co: 0.2 |
| 2-G | 0.013 | 0.65 | 0.28 | 0.025 | 0.0002 | 14.6 | 0.32 | 1.60 | 0.015 | 0.0002 | 0.002 | 0.17 | 0.002 | 0.002 | 0.196 | |
| 2-H | 0.012 | 0.75 | 0.25 | 0.012 | 0.0005 | 14.3 | 0.14 | 2.10 | 0.015 | 0.0003 | 0.016 | 0.02 | 0.000 | 0.000 | 0.183 | REM: 0.03 |
| 2-I | 0.006 | 0.48 | 0.55 | 0.028 | 0.0007 | 12.8 | 0.14 | 1.10 | 0.013 | 0.0015 | 0.002 | 0.00 | 0.019 | 0.006 | 0.060 | Zr: 0.03, La: 0.02, Y: 0.02, Hf: 0.01 |
| <u>2-J</u> | 0.004 | 0.54 | 0.13 | 0.022 | 0.0007 | <u>11.7</u> | 0.13 | 1.10 | 0.010 | 0.0012 | 0.003 | 0.01 | 0.002 | 0.004 | 0.058 | |
| <u>2-K</u> | 0.014 | 0.51 | <u>1.10</u> | 0.020 | 0.0007 | 13.3 | 0.12 | 1.20 | 0.016 | 0.0009 | 0.003 | 0.01 | 0.002 | 0.000 | 0.051 | |
| <u>2-L</u> | 0.011 | 0.52 | 0.20 | 0.020 | <u>0.0035</u> | 13.2 | 0.13 | 1.10 | 0.015 | 0.0000 | 0.002 | 0.01 | 0.000 | 0.004 | 0.034 | |
| <u>2-M</u> | <u>0.023</u> | 0.53 | 0.35 | 0.030 | 0.0007 | 13.2 | 0.11 | 1.10 | <u>0.031</u> | 0.0008 | 0.002 | 0.01 | 0.003 | 0.000 | 0.041 | |
| <u>2-N</u> | 0.005 | 0.54 | 0.35 | 0.030 | 0.0007 | <u>16.3</u> | 0.12 | 1.10 | 0.025 | 0.0007 | 0.003 | 0.01 | 0.000 | 0.003 | 0.050 | |
| <u>2-O</u> | 0.012 | 0.53 | 0.32 | 0.021 | 0.0005 | 13.5 | 0.13 | 1.30 | 0.013 | 0.0003 | 0.000 | 0.01 | 0.003 | 0.003 | <u>0.019</u> | |

(Annotation 1) Expression (1): 10(B + Ga) + Sn + Mg + Ca  (Annotation 2) Underlines indicate steel or values deviated from those of the present invention

TABLE 4

| No. | Steel | Hot-band annealing Whether the step was performed | Temperature (° C.) | Cold rolling reduction rate (%) | Texture {111}/% | {110}/% | Oxidation resistance | High-temperature strength | Structural stability | Remarks |
|---|---|---|---|---|---|---|---|---|---|---|
| 2-1 | 2-A | Performed | 650 | 70 | 50.0 | 1.0 | B | B | A | Present Example |
| 2-2 | 2-B | Not performed | — | 75 | 40.0 | 2.5 | A | A | A | Present Example |
| 2-3 | | Performed | 650 | 75 | 45.0 | 1.8 | A | A | A | Present Example |
| 2-4 | 2-C | Not performed | — | 60 | 50.0 | 0.8 | B | B | A | Present Example |
| 2-5 | 2-D | Performed | 600 | 65 | 48.0 | 1.0 | B | B | A | Present Example |
| 2-6 | 2-E | Performed | 680 | 75 | 51.0 | 1.1 | B | B | A | Present Example |
| 2-7 | 2-F | Performed | 650 | 60 | 48.0 | 1.5 | A | A | A | Present Example |
| 2-8 | 2-G | Not performed | — | 75 | 42.0 | 3.5 | B | A | A | Present Example |
| 2-9 | 2-H | Performed | 600 | 70 | 45.0 | 1.2 | A | A | A | Present Example |
| 2-10 | | Performed | <u>1020</u> | 70 | <u>65.0</u> | 0.4 | A | C | A | Comparative Example |
| 2-11 | 2-I | Not performed | — | 75 | 50.0 | 1.0 | B | B | A | Present Example |
| 2-12 | | Performed | 650 | <u>28</u> | 30.0 | <u>0</u> | B | C | A | Comparative Example |
| 2-13 | <u>2-J</u> | Performed | 650 | 75 | <u>62.0</u> | 0.6 | C | C | A | Comparative Example |
| 2-14 | <u>2-K</u> | Performed | 650 | 75 | 56.0 | 0.7 | C | C | A | Comparative Example |
| 2-15 | <u>2-L</u> | Performed | 650 | 75 | 55.0 | 0.7 | C | C | A | Comparative Example |
| 2-16 | <u>2-M</u> | Performed | 650 | 75 | 54.0 | 0.7 | C | C | A | Comparative Example |
| 2-17 | <u>2-N</u> | Performed | 650 | 75 | 45.0 | 3.5 | C | C | C | Comparative Example |
| 2-18 | <u>2-O</u> | Performed | 650 | 75 | 54.0 | 0.8 | C | C | A | Comparative Example |

(Annotation) Underlines indicate steel or values deviated from those of the present invention

[Third Aspect]

Various ferritic stainless steel having components shown in Table 5 were melted (Steel 3-A to 3-O), formed into hot-rolled plates with a thickness of 2.0 to 4.0 mm by hot rolling, subjected to hot-band annealing and acid washing, and subjected to cold rolling, and thereby cold-rolled steel sheets each having a plate thickness of 0.8 mm to 1.5 mm were manufactured. The treatment temperature of hot-band annealing and the rolling reduction rate during cold rolling (cold rolling reduction rate) were as shown in Table 6.

After the cold rolling, final annealing was performed at 900° C. to 1,000° C., and the cold-rolled steel sheet obtained was subjected to mechanical polishing (#80) and an acid immersion step (treatment (A) and treatment (B)) under conditions shown in Table 6, and thereby finished steel sheets (Nos. 3-1 to 3-21) were obtained.

Regarding the obtained finished steel sheets, a texture, a composition of the steel sheet surface layer part, a $\Delta E_{A1}$ of Al 1 s orbit, a $\Delta E_{Si}$ of Si 1 s orbit, a half-value width ($Al_{FWHM}$) of an oxide peak of Al, and a half-value width ($Si_{FWHM}$) of an oxide peak of Si in the passivation film were each measured, and various characteristics were evaluated.

Treatment (A): immersion in a sulfuric acid aqueous solution at 90° C. or lower containing 10 to 50 mass % of $H_2SO_4$.

Treatment (B): Immersion in a nitric-hydrofluoric acid aqueous solution at 90° C. or lower containing 1 mass % or more of $HNO_3$ and 0.5 mass % or more of HF.

In Table 6, the term "Performed" indicates that each of the treatments was performed, and the symbol "−" indicates that the treatment was not performed.

[Texture]

The area ratio of each of {111}±10° oriented grains and {110}±10° oriented grains was analyzed using an electron beam backscattering diffraction method (hereinafter, EBSD method).

First, in a plane (L cross-section) parallel to the steel sheet surface at the plate thickness middle portion, using a scanning electron microscope and an EBSD detector, the measurement was performed at a measurement region of a plate width direction of 850 μm and a rolling direction of 2,250 μm with a magnification of 100. Next, using EBSD analysis software OIM-Analysis (manufactured by TSL), and the measurement data, an area ratio was calculated by displaying a crystal orientation map of crystal grains in which an angle difference between the normal direction of the plane parallel to the steel sheet surface and the {111} plane orientation was within 10° (that is, {111}±10° oriented grains). The area ratio of {110}±10° oriented grains was calculated by the same method.

In Table 6, an area ratio of {111}±10° oriented grains is expressed as "{111}%", and an area ratio of {110}±10° oriented grains is expressed as "{110}%."

[Composition of Steel Sheet Surface Layer Part (Maximum Concentration of Cr, Al, and Si)]

The maximum concentrations of Cr, Al, and $Si_m$ ($Cr_m$, $Al_m$, $Si_m$) in the steel sheet surface layer part (a region from the steel sheet surface to a depth of 30 nm f) were obtained by measuring the concentration profile of each element from the steel sheet surface to a depth of 30 nm in a depth direction by glow discharge optical emission spectrometry (GDS analysis method). Specifically, first, among Fe, Cr, Mn, Si, Al, Ti, Nb, C, N, and O detected by GDS analysis, profiles of each of the elements except C, N, and O were created. Then, values at each position in which the Cr, Al, and Si concentrations showed maximum values within the range from the steel sheet surface to the depth of 30 nm are respectively represented by "Cr maximum concentration ($Cr_m$)," "Al maximum concentration ($Al_m$)," and "Si maximum concentration ($Si_m$)."

[$\Delta E_{A1}$, $\Delta E_{Si}$, Half-Value Width of Oxide Peaks of Al and Si ($Al_{FWHM}$ and $Si_{FWHM}$)]

The passivation film was measured by hard X-ray photoelectron spectroscopy in order to examine the presence state of Al and Si in the passivation film. The measurement by hard X-ray photoelectron spectroscopy was performed using a hard X-ray photoelectron spectrometer ("R-4000" manufactured by Scienta Omicron) under the following conditions.

In the obtained photoelectron spectra for the Al 1 s orbit and the Si 1 s orbit, binding energy differences $\Delta E_{A1}$ and $\Delta E_{Si}$ (eV) between the oxide peak in the passivation film and the metal peak in the base material below the passivation film were obtained. Specifically, $\Delta E_{A1}$ and $\Delta E_{Si}$ (eV) can be calculated by separating the peaks in the obtained photoelectron spectra and obtaining an energy difference between the peaks (peak tops) of the metal peak and the oxide peak.

Furthermore, a half-value width of the oxide peak of the Al 1 s orbit ($Al_{FWHM}$) and a half-value width of the oxide peak of the Si 1 s orbit ($Si_{FWHM}$) were obtained by peak fitting. Data analysis software ("Multi Pack" manufactured by ULVAC-PHI, Inc.) was used for peak fitting (fitting function; Gaussian function, Lorentz function).

Figure 2:
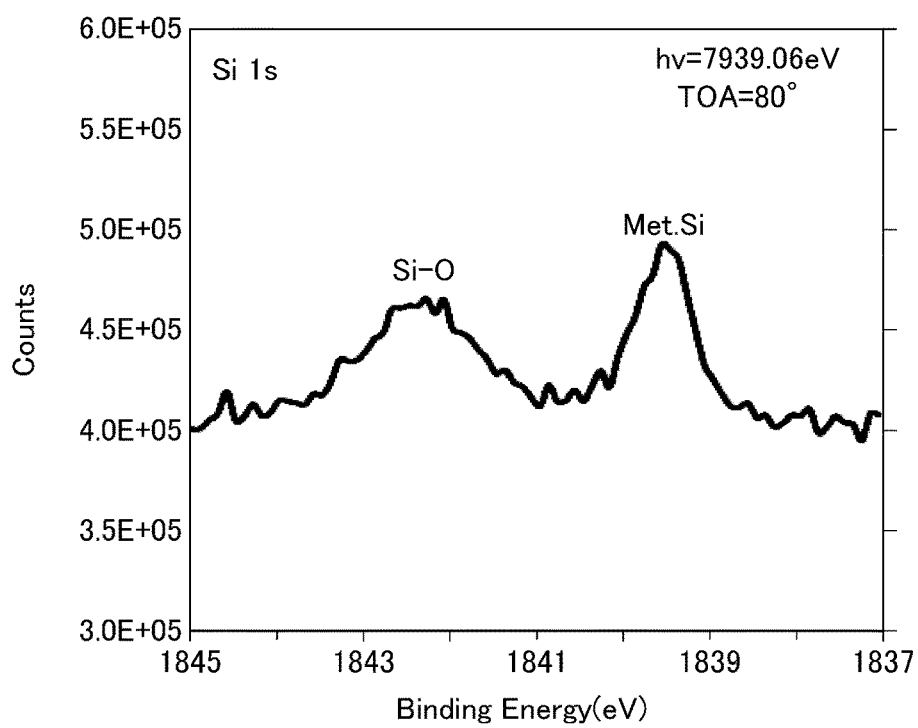
FIG. 2 shows a photoelectron spectrum for Si 1 s orbit obtained by hard X-ray photoelectron spectroscopy in Present Example No. 3-6.

As examples of photoelectron spectra for Al is orbit and Si 1 s orbit, FIGS. 1 and 2 respectively show a photoelectron spectrum for Al is orbit and a photoelectron spectrum for Si 1 s orbit in Present Example No. 3-6. In the present example, $\Delta E_{A1}$, $\Delta E_{Si}$ (eV), and each half-value width were obtained from the photoelectron spectra shown in FIGS. 1 and 2. The "E+05" on a vertical axis in FIGS. 1 and 2 means "$\times 10^5$."

<Measurement Conditions of Hard X-Ray Photoelectron Spectroscopy>

Excited X-ray energy: 7939.06 eV
Photoelectron extraction angle (TOA): 80°
Analyzer slit: curved 0.5 mm
Analyzer pass energy: 200 eV

[Oxidation Resistance]

First, a oxidized test piece having a width of 20 mm and a length of 25 mm was cut out from the finished steel sheet and subjected to an oxidation test. The atmosphere for the oxidation test was 28 vol % of $H_2O$—10% vol % of CO—8 vol % of $CO_2$—0.01 of $H_2S$-bal·$H_2$ in which it was assumed to be a reformed gas having city gas as a fuel. In the atmosphere, the oxidized test piece was heated to 800° C., retained for 1,000 hours, and then cooled to room temperature, and an oxidation increase $\Delta W$ (mg/cm$^2$) was measured.

The evaluation of oxidation resistance was as follows.

A: A weight increase $\Delta W$ was less than 0.2 mg/cm$^2$.
B: A weight increase $\Delta W$ was 0.2 to 0.3 mg/cm$^2$.
C: A weight increase $\Delta W$ was more than 0.3 mg/cm$^2$.

The oxidation resistance was considered acceptable when the evaluation was "A" or "B."

[High-Temperature Strength]

A plate-shaped high-temperature tensile test piece (plate thickness: 0.8 to 1.5 mm, parallel part width: 10.5 mm, parallel part length: 35 mm) having a longitudinal direction in a rolling direction was produced from the finished steel sheet. A high-temperature tensile test was performed at each temperature of 750° C. and 800° C. Specifically, the high-temperature tensile test was performed with a strain rate of 0.3%/min up to 0.2% proof stress, and then 3 mm/min for proof stress of more than 0.2% proof stress, and a 0.2% proof stress at each of the temperatures (750° C. proof stress, 800° C. proof stress) was measured (according to JIS G 0567).

The evaluation of high-temperature strength was performed, and when a 750° C. proof stress was more than 130 MPa and an 800° C. proof stress was more than 45 MPa, the high-temperature strength was evaluated as being acceptable ("B"), and when any one thereof was not satisfied, it was evaluated as being not acceptable ("C"). When a 750° C. proof stress was more than 150 MPa and an 800° C. proof stress was more than 60 MPa, the high-temperature strength was evaluated as being particularly excellent (indicated as "A" in Table 6).

[Structural Stability (σ Brittleness/475° C. Brittleness)]

Two samples were taken from the finished steel sheet such that the center of the cross-section perpendicular to the plate surface (plate thickness middle portion: around t/2) could be observed, one of which was subjected to a heat treatment at 500° C.×1,000 hours (500° C. heat treatment), and the other was subjected to a heat treatment at 650° C.×1,000 hours (600° C. heat treatment). The atmosphere for these heat treatments was atmospheric air. Next, after each of the heat-treated samples was embedded in resin and polished, the Vickers hardness $Hv_{500° C.}$ after the heat treatment at 500° C. and the Vickers hardness $Hv_{650° C.}$ after the heat treatment at 650° C. were each measured under a load of 9.8 N in accordance with JIS Z 2244, and the hardness increase amounts $\Delta Hv_{500° C.}$ and $\Delta Hv_{650° C.}$ were calculated from the Vickers hardness before the heat treatment which was preliminarily measured before the heat treatment.

Regarding the evaluation of the structural stability (σ brittleness/475° C. brittleness), a case in which each of $\Delta Hv_{500° C.}$ and $\Delta Hv_{650° C.}$ was less than 20 was evaluated as being acceptable ("A"), and a case in which any one thereof was 20 or more was evaluated as being not acceptable because the structure in which hardness was significantly increased after the heat treatment was unstable.

Table 6 shows the obtained evaluation results.

Nos. 3-1, 3-4, 3-5, 3-7 to 3-9, and 3-11 to 3-14 satisfied the components, the texture, and the composition of the surface layer part specified in the present invention, and all the characteristics were evaluated as "B" or "A."

Among them, Nos. 3-5, 3-11, and 3-13 were cases in which the composition of the surface layer part was satisfied, and the presence state of Al and Si ($\Delta E_{A1}$, $\Delta E_{Si}$, each half-value width) in the passivation film was within the suitable range of the present invention. They exhibited a remarkable effect of improving oxidation resistance, and therefore the evaluation thereof was "A."

On the other hand, Nos. 3-2, 3-3, 3-6, 3-10, and 3-15 were examples which were out of the manufacture conditions defined by the present invention and in which the composition of the surface layer part targeted by the present invention was not satisfied, and therefore the evaluation of oxidation resistance (800° C.) was "C." In addition, Steel Nos. 3-16 to 3-21 were out of the steel composition specified in the present invention. They did not satisfy each of the characteristics targeted by the present invention, and the evaluation of each steel was "C."

TABLE 5

| | Component (mass %): balance consisting of Fe and impurities | | | | | | | | | | | | | | Expression | Other |
|---|---|---|---|---|---|---|---|---|---|---|---|---|---|---|---|---|
| Steel | C | Si | Mn | P | S | Cr | Nb | Al | N | B | Ga | Sn | Mg | Ca | (1) | elements |
| 3-A | 0.016 | 0.41 | 0.18 | 0.029 | 0.0280 | 15.9 | 0.59 | 1.10 | 0.030 | 0.0025 | 0.000 | 0.00 | 0.000 | 0.000 | 0.025 | |
| 3-B | 0.009 | 0.96 | 0.24 | 0.022 | 0.0009 | 14.0 | 0.30 | 1.99 | 0.015 | 0.0015 | 0.000 | 0.02 | 0.000 | 0.000 | 0.035 | |
| 3-C | 0.007 | 2.40 | 0.30 | 0.024 | 0.0005 | 12.1 | 0.25 | 0.89 | 0.011 | 0.0002 | 0.014 | 0.00 | 0.005 | 0.005 | 0.152 | |
| 3-D | 0.002 | 0.50 | 0.26 | 0.021 | 0.0004 | 13.1 | 0.12 | 2.45 | 0.005 | 0.0026 | 0.000 | 0.02 | 0.006 | 0.000 | 0.052 | Ni: 0.29, Cu: 0.40, W: 0.20 |
| 3-E | 0.005 | 1.20 | 0.30 | 0.040 | 0.0004 | 13.5 | 0.49 | 1.41 | 0.009 | 0.0005 | 0.001 | 0.00 | 0.001 | 0.007 | 0.023 | Ti: 0.15, Mo: 0.40, V: 0.20 |
| 3-F | 0.010 | 0.92 | 0.90 | 0.029 | 0.0020 | 13.9 | 0.39 | 1.55 | 0.015 | 0.0050 | 0.004 | 0.01 | 0.000 | 0.000 | 0.100 | Sb: 0.01, Co: 0.30 |
| 3-G | 0.013 | 0.61 | 0.41 | 0.022 | 0.0003 | 14.1 | 0.22 | 1.60 | 0.015 | 0.0003 | 0.004 | 0.17 | 0.001 | 0.002 | 0.216 | |
| 3-H | 0.014 | 0.69 | 0.26 | 0.011 | 0.0006 | 15.1 | 0.40 | 2.20 | 0.012 | 0.0004 | 0.015 | 0.01 | 0.000 | 0.000 | 0.164 | REM: 0.02 |
| 3-I | 0.011 | 0.49 | 0.64 | 0.030 | 0.0010 | 12.1 | 0.30 | 1.15 | 0.013 | 0.0012 | 0.003 | 0.00 | 0.019 | 0.006 | 0.067 | Zr: 0.02, La: 0.01, Y: 0.01, Hf: 0.02 |
| 3-J | 0.006 | 0.59 | 0.17 | 0.026 | 0.0008 | 11.3 | 0.24 | 1.10 | 0.010 | 0.0012 | 0.003 | 0.01 | 0.002 | 0.004 | 0.058 | |
| 3-K | 0.013 | 0.58 | 1.18 | 0.021 | 0.0008 | 13.5 | 0.25 | 1.22 | 0.015 | 0.0010 | 0.002 | 0.01 | 0.002 | 0.000 | 0.042 | |
| 3-L | 0.009 | 0.53 | 0.20 | 0.020 | 0.0037 | 13.3 | 0.25 | 1.10 | 0.014 | 0.0000 | 0.003 | 0.01 | 0.002 | 0.004 | 0.046 | |
| 3-M | 0.025 | 0.54 | 0.33 | 0.030 | 0.0009 | 13.5 | 0.24 | 1.09 | 0.035 | 0.0008 | 0.003 | 0.01 | 0.003 | 0.000 | 0.051 | |
| 3-N | 0.009 | 0.53 | 0.35 | 0.029 | 0.0008 | 16.7 | 0.26 | 1.10 | 0.022 | 0.0005 | 0.003 | 0.01 | 0.000 | 0.003 | 0.048 | |
| 3-O | 0.015 | 0.55 | 0.31 | 0.021 | 0.0004 | 13.1 | 0.25 | 1.31 | 0.015 | 0.0002 | 0.000 | 0.01 | 0.003 | 0.003 | 0.018 | |

(Annotation 1) Expression (1): 10(B + Ga) + Sn + Mg + Ca (Annotation 2) Underlines indicate steel or values deviated from those of the present invention

TABLE 6

| | | Hot-band annealing | Finish conditions after annealing | | | | | | | |
|---|---|---|---|---|---|---|---|---|---|---|
| | | Whether the step was performed | Cold rolling | | Acid immersion step | | Texture | | Composition of surface layer part (mass %) | |
| | | | Temperature (° C.) | reduction rate (%) | Mechanical polishing | Treatment (A) | Treatment (B) | {111}/% | {110}/% | $Cr_m$ | $Al_m$ |
| No. | Steel | | | | | | | | | | |
| 3-1 | 3-A | Performed | 650 | 70 | Performed | Performed | Performed | 51.0 | 1.0 | 30.9 | 9.0 |
| 3-2 | 3-B | Not performed | | 75 | Performed | — | — | 39.0 | 2.7 | 13.1 | 1.5 |
| 3-3 | | Performed | 650 | 75 | — | — | Performed | 46.0 | 2.0 | 32.0 | 1.8 |
| 3-4 | | Performed | 650 | 75 | Performed | Performed | — | 45.0 | 1.8 | 46.5 | 7.0 |
| 3-5 | | Performed | 650 | 75 | Performed | Performed | Performed | 45.0 | 1.7 | 51.5 | 10.1 |
| 3-6 | | Performed | 1020 | 75 | Performed | Performed | Performed | 66.0 | 0.3 | 50.5 | 9.6 |
| 3-7 | 3-C | Performed | 650 | 60 | Performed | Performed | Performed | 51.0 | 1.2 | 19.5 | 8.5 |
| 3-8 | 3-D | Performed | 650 | 65 | Performed | Performed | Performed | 49.0 | 1.1 | 34.5 | 12.1 |
| 3-9 | 3-E | Performed | 680 | 75 | Performed | Performed | — | 50.0 | 1.0 | 40.9 | 9.5 |
| 3-10 | | Performed | 1020 | 75 | Performed | Performed | Performed | 65.0 | 0.3 | 38.9 | 11.1 |
| 3-11 | 3-F | Performed | 650 | 60 | Performed | Performed | Performed | 47.0 | 1.2 | 37.1 | 11.1 |
| 3-12 | 3-G | Performed | 650 | 75 | Performed | Performed | Performed | 42.0 | 3.6 | 40.5 | 11.9 |
| 3-13 | 3-H | Performed | 600 | 70 | Performed | Performed | Performed | 44.0 | 1.2 | 42.1 | 13.5 |
| 3-14 | 3-I | Performed | 650 | 75 | Performed | Performed | Performed | 43.0 | 1.5 | 19.5 | 8.1 |
| 3-15 | | Performed | 650 | 35 | Performed | Performed | Performed | 30.0 | 0 | 18.9 | 6.9 |
| 3-16 | 3-J | Performed | 650 | 75 | Performed | Performed | Performed | 63.0 | 0.6 | 14.4 | 2.1 |
| 3-17 | 3-K | Performed | 650 | 75 | Performed | Performed | Performed | 55.0 | 0.7 | 12.2 | 2.1 |
| 3-18 | 3-L | Performed | 650 | 75 | Performed | Performed | Performed | 55.0 | 0.6 | 30.1 | 2.4 |
| 3-19 | 3-M | Performed | 650 | 75 | Performed | Performed | Performed | 56.0 | 0.7 | 13.9 | 1.6 |
| 3-20 | 3-N | Performed | 650 | 75 | Performed | Performed | Performed | 46.0 | 3.7 | 48.9 | 0.9 |
| 3-21 | 3-O | Performed | 650 | 75 | Performed | Performed | Performed | 54.0 | 0.7 | 29.1 | 0.9 |

| | Composition of surface layer part (mass %) | | ΔE and half-value width | | | | Oxidation resistance (800° C.) | High-temperature strength | Structural stability | Remarks |
|---|---|---|---|---|---|---|---|---|---|---|
| No. | $Si_m$ | $Al_m + Si_m$ | $\Delta E_{Al}$ | $\Delta E_{Si}$ | $Al_{FWHM}$ | $Si_{FWHM}$ | | | | |
| 3-1 | 5.1 | 14.1 | 1.6 | 1.7 | 2.1 | 2.4 | B | B | A | Present Example |
| 3-2 | 0.5 | 2.0 | 1.4 | 0.8 | 2.8 | 3.0 | C | A | A | Comparative Example |
| 3-3 | 1.0 | 2.8 | 3.2 | 0.8 | 3.0 | 2.7 | C | A | A | Comparative Example |
| 3-4 | 5.5 | 12.5 | 2.1 | 2.5 | 2.0 | 1.6 | B | A | A | Present Example |

TABLE 6-continued

| | | | | | | | | | | |
|---|---|---|---|---|---|---|---|---|---|---|
| 3-5 | 5.5 | 15.6 | 2.0 | 2.4 | 1.9 | 1.4 | A | A | A | Present Example |
| 3-6 | 5.4 | 15.0 | 2.1 | 2.8 | 1.9 | 1.5 | A | C | A | Comparative Example |
| 3-7 | 12.1 | 20.6 | 1.8 | 3.4 | 2.1 | 1.6 | B | B | A | Present Example |
| 3-8 | 3.2 | 15.3 | 2.2 | 1.7 | 1.9 | 2.2 | B | B | A | Present Example |
| 3-9 | 2.7 | 12.2 | 1.9 | 2.2 | 2.2 | 1.5 | B | B | A | Present Example |
| 3-10 | 5.4 | 16.5 | 1.9 | 2.4 | 2.0 | 1.5 | B | C | A | Comparative Example |
| 3-11 | 6.8 | 17.9 | 2.1 | 2.5 | 1.8 | 1.6 | A | A | A | Present Example |
| 3-12 | 3.1 | 15.0 | 2.0 | 1.7 | 1.5 | 2.0 | B | A | A | Present Example |
| 3-13 | 5.6 | 19.1 | 2.0 | 2.0 | 1.8 | 1.5 | A | A | A | Present Example |
| 3-14 | 2.9 | 11.0 | 1.9 | 1.6 | 2.1 | 2.1 | B | B | A | Present Example |
| 3-15 | 2.8 | 9.7 | 1.9 | 1.5 | 2.2 | 2.1 | B | C | A | Comparative Example |
| 3-16 | 0.8 | 2.9 | 1.4 | 0.8 | 2.8 | 2.6 | C | C | A | Comparative Example |
| 3-17 | 0.7 | 2.8 | 1.4 | 0.9 | 3.1 | 2.7 | C | C | A | Comparative Example |
| 3-18 | 0.5 | 2.9 | 1.5 | 0.9 | 2.8 | 2.6 | C | C | A | Comparative Example |
| 3-19 | 1.0 | 2.6 | 1.5 | 0.7 | 2.7 | 3.2 | C | C | A | Comparative Example |
| 3-20 | 0.9 | 1.8 | 1.4 | 0.8 | 2.6 | 2.7 | C | C | C | Comparative Example |
| 3-21 | 2.0 | 2.9 | 1.3 | 0.9 | 2.9 | 3.0 | C | C | A | Comparative Example |

(Annotation) Underlines indicate steel or values deviated from those of the present invention

What is claimed is:

1. Ferritic stainless steel, comprising, by mass %:
Cr: 12.0% to 16.0%;
C: 0.020% or less;
Si: 1.10% or more and 2.50% or less;
Mn: 1.00% or less;
P: 0.050% or less;
S: 0.0030% or less;
Al: 1% or more and 2.50% or less;
N: 0.030% or less;
Nb: 0.001% to 1.00%;
Ni: 0% to 1.0%;
Cu: 0% to 1.0%;
Mo: 0% to 1.0%;
Sb: 0% to 0.5%;
W: 0% to 1.0%;
Co: 0% to 0.5%;
V: 0% to 0.5%;
Ti: 0% to 0.5%;
Zr: 0% to 0.5%;
La: 0% to 0.1%;
Y: 0% to 0.1%;
Hf: 0% to 0.1%;
REM: 0 to 0.1%;
one or more of B: 0.0200% or less, Sn: 0.20% or less, Ga: 0.0200% or less, Mg: 0.0200% or less, and Ca: 0.0100% or less; and a balance being Fe and impurities,
wherein Expression (1) is satisfied, $$10(B+Ga)+Sn+Mg+Ca>0.020 \quad (1)$$

where each of the element symbols in Expression (1) indicates the content, in mass %, each of the elements in the steel, and
wherein a concentration of Nb at a crystal grain boundary is within a range of 3.0% to 10% by mass %.

2. The ferritic stainless steel according to claim 1, comprising B: 0.0002% or more and 0.0200% or less by mass %.

3. The ferritic stainless steel according to claim 1, comprising:
0.005% or more and 0.20% or less by mass % of Sn, wherein a concentration of Sn at a crystal grain boundary is 1.0% to 5.0% by mass %.

4. The ferritic stainless steel according to claim 1, comprising, by mass %:
Nb: 0.15% or more and 1.00% or less.

5. The ferritic stainless steel according to claim 1, comprising, by mass %, one or more of Ni: 0.10% to 1.0%, Cu: 0.10% to 1.0%, Mo: 0.10% to 1.0%, Sb: 0.01% to 0.5%, W: 0.10% to 1.0%, Co: 0.10% to 0.5%, V: 0.10% to 0.5%, Ti: 0.01% to 0.5%, Zr: 0.01% To 0.5%, La: 0.001% to 0.1% or less, Y: 0.001% to 0.1%, Hf: 0.001% to 0.1%, and REM: 0.001% to 0.1%.

6. The ferritic stainless steel according to claim 1, which is applied to a fuel reformer, a heat exchanger, or a fuel cell member.

7. The ferritic stainless steel according to claim 1, which is applied to a combustor or a burner member.

8. A fuel cell member formed of the ferritic stainless steel according claim 1.

9. A method for manufacturing the ferritic stainless steel according to claim 1, the method comprising:
performing hot working on a ferritic stainless steel having the composition according to claim 1;
performing a heat treatment at a temperature higher than 700° C. thereafter;
performing cold working thereafter;
performing final annealing at a temperature higher than 700° C. thereafter; and
performing one of the following steps selected from (i) and (ii):

(i) performing a heat treatment to retain a temperature within a temperature range of 600° C. to 700° C. for longer than 1 minute and 3 hours or shorter after the final annealing;
(ii) performing a cooling in the final annealing with a passage time in the temperature range of 600° C. to 700° C. set to longer than 1 minute;

thereby resulting in the ferritic stainless steel according to claim 1.

\* \* \* \* \*